(12) United States Patent
Zhang

(10) Patent No.: US 11,788,791 B2
(45) Date of Patent: Oct. 17, 2023

(54) HEAT PUMP DRYER

(71) Applicant: Yong Zhang, Guangzhou (CN)

(72) Inventor: Yong Zhang, Guangzhou (CN)

( * ) Notice: Subject to any disclaimer, the term of this patent is extended or adjusted under 35 U.S.C. 154(b) by 588 days.

(21) Appl. No.: 16/953,082

(22) Filed: Nov. 19, 2020

(65) Prior Publication Data

US 2022/0074663 A1     Mar. 10, 2022

(30) Foreign Application Priority Data

Sep. 4, 2020   (CN) .......................... 202010923235.3

(51) Int. Cl.
*F26B 23/10*     (2006.01)
*F25B 30/02*     (2006.01)

(52) U.S. Cl.
CPC .............. *F26B 23/10* (2013.01); *F25B 30/02* (2013.01); *F25B 2313/00* (2013.01)

(58) Field of Classification Search
CPC ....... F26B 23/10; F25B 30/02; F25B 2313/00
USPC ............................................................ 34/90
See application file for complete search history.

(56) References Cited

U.S. PATENT DOCUMENTS

| | | | | |
|---|---|---|---|---|
| 3,696,588 A | * | 10/1972 | Dussourd | B60T 17/004 96/113 |
| 4,738,120 A | * | 4/1988 | Lin | F24F 3/1423 62/93 |
| 4,987,748 A | * | 1/1991 | Meckler | F24F 5/0089 62/271 |
| RE37,464 E | * | 12/2001 | Meckler | F24F 12/003 62/93 |
| 6,711,907 B2 | * | 3/2004 | Dinnage | F24F 3/1423 62/271 |
| 7,103,991 B2 | * | 9/2006 | Moulding | B60T 17/004 34/330 |
| 7,326,277 B1 | * | 2/2008 | Cohen | B60T 17/004 96/125 |
| 8,640,360 B2 | * | 2/2014 | Stamm | F04D 25/08 702/182 |
| 10,746,177 B2 | * | 8/2020 | Collins | F25B 5/02 |
| 11,203,834 B2 | * | 12/2021 | Christensen | D06F 58/04 |
| 11,684,891 B2 | * | 6/2023 | Bergh | B01D 53/06 34/398 |
| 2022/0074663 A1 | * | 3/2022 | Zhang | F25B 6/04 |
| 2023/0221044 A1 | * | 7/2023 | Yang | F25B 9/00 62/160 |

FOREIGN PATENT DOCUMENTS

CN          111895772 A   *  11/2020  ............. F25B 30/02

* cited by examiner

*Primary Examiner* — Stephen M Gravini
(74) *Attorney, Agent, or Firm* — Tsz Lung Yeung

(57) ABSTRACT

A heat pump dryer includes a main casing, a compressor, a first heat exchanger having a first portion and a second portion, and a second heat exchanger. The main casing has an air inlet, a first outlet conduit, a second outlet conduit, a first air outlet, and a second air outlet. Air is arranged to enter the main casing through the air inlet, and is arranged to be bifurcated to pass through the first outlet conduit and the second outlet conduit. The air in the first outlet conduit is arranged to sequentially flow through the second heat exchanger and the first portion of the first heat exchanger, whereas the air in the second outlet conduit is arranged to flow through the second portion of the second heat exchanger.

29 Claims, 11 Drawing Sheets

HEAT PUMP DRYER

CROSS REFERENCE TO RELATED APPLICATION

This is a non-provisional application which claims priority to a Chinese patent application having an application number of CN 202010923235.3, and a filing date of Sep. 4, 2020, the entire contents of which is hereby incorporated by reference.

BACKGROUND

Field of Invention

The present invention relates to a dryer, and more particularly to a heat pump dryer which is capable of providing heat exchange between refrigerant and air in a very energy efficient manner.

Description of Related Arts

Conventional drying technologies utilize coal, gas or other fossil fuel as energy source for generating heat to dry objects. These conventional drying technologies are usually energy inefficient and may have adverse effect to environment. Thus, heat pump drying assemblies have been developed to generate heat in a more energy efficient manner. Conventional heat pump drying assemblies utilize several heat exchangers for performing heat exchange between refrigerant and air. However, conventional heat pump drying assemblies suffer from low heat exchange efficiency because air must be dehumidified after passing through an evaporator. This inevitably requires reducing flow rate of the air passing through a condenser. As a result, less heat is extracted by the condenser and the overall heat exchange efficiency tend to be unsatisfactory.

Thus, there is a need to develop a heat pump dryer which has enhanced heat exchange efficiency.

SUMMARY OF THE PRESENT INVENTION

Certain variations of present invention provide a heat pump dryer comprising an energy efficient heat exchanger which is capable of providing heat exchange between refrigerant and air in a very energy efficient manner.

Certain variations of present invention provide a heat pump dryer which comprises a main casing having an air inlet, a first outlet conduit and a second outlet conduit, air passing through the first outlet conduit and a second outlet conduit may have different temperature and humidity for achieving different drying objectives Certain variations of present invention provide a heat pump dryer which is capable of providing two separate streams of drying air having different temperature and relative humidity so as to facilitate convenient drying of a wide variety of items which may have different drying requirements.

In one aspect of embodiments of the present disclosure, it provides a heat pump dryer, comprising:
  a plurality of connecting pipes for allowing heat exchange medium to pass therethrough;
  a main casing having an air inlet, a first air outlet, a second air outlet, a heat exchanging compartment, and an air passage, the main casing comprising a partitioning member provided in the heat exchanging compartment to divide the heat exchanging compartment into an air inlet channel and an air outlet channel, and an air outlet divider provided in the air outlet channel to divide the air outlet channel into a first outlet conduit and a second outlet conduit, wherein the air inlet channel communicates with the air inlet while the first outlet conduit and the second outlet conduit communicate with the first air outlet and the second air outlet respectively, the air inlet channel communicating with the air outlet channel through the air passage;
  a compressor;
  a first heat exchanger provided in the heat exchanging compartment of the main casing and connected to the compressor through at least one of the connecting pipes, the first heat exchanger having a first portion exposed to the first outlet conduit, and a second portion exposed to the second outlet conduit;
  a second heat exchanger connected to the compressor and the first heat exchanger through at least one of the connecting pipes, the second heat exchanger being positioned in the first outlet conduit adjacent to the first portion of the first heat exchanger and between the first heat exchanger and the air passage;
  a first fan and a second fan provided in the first outlet conduit and the second outlet conduit respectively; and
  a water discharge arrangement connected to the second heat exchanger;
  wherein air is arranged to enter the air inlet channel through the air inlet, the air passing through the air inlet being bifurcated to pass through the first outlet conduit and the second outlet conduit through the air passage, the air in the first outlet conduit being arranged to sequentially flow through the second heat exchanger and the first portion of the first heat exchanger, the air in the second outlet conduit being arranged to flow through the second portion of the second heat exchanger,
  wherein a predetermined amount of refrigerant is arranged to leave the compressor and enter the first heat exchanger for releasing heat to the air passing therethrough, the refrigerant leaving the first heat exchanger being arranged to enter the second heat exchanger for absorbing a predetermined amount of heat from the air passing therethrough so as to remove a predetermined amount of water from the air passing through the second heat exchanger.

In another aspect of embodiments of the present disclosure, it provides a heat pump dryer, comprising:
  a plurality of connecting pipes for allowing heat exchange medium to pass therethrough;
  a main casing having an air inlet, a first air outlet, a second air outlet, a heat exchanging compartment, and an air passage, the main casing comprising a partitioning member provided in the heat exchanging compartment to divide the heat exchanging compartment into an air inlet channel and an air outlet channel, and an air outlet divider provided in the air outlet channel to divide the air outlet channel into a first outlet conduit and a second outlet conduit, wherein the air inlet channel communicates with the air inlet while the first outlet conduit and the second outlet conduit communicate with the first air outlet and the second air outlet respectively, the air inlet channel communicating with the air outlet channel through the air passage;
  a compressor;
  a first heat exchanger provided in the heat exchanging compartment of the main casing and connected to the compressor through at least one of the connecting pipes, the first heat exchanger having a first portion exposed to the first outlet conduit, and a second portion exposed to the second outlet conduit;

a second heat exchanger connected to the compressor and the first heat exchanger through at least one of the connecting pipes, the second heat exchanger being positioned in the first outlet conduit adjacent to the first portion of the first heat exchanger and between the first heat exchanger and the air passage;

a first fan and a second fan provided in the first outlet conduit and the second outlet conduit respectively;

a water discharge arrangement connected to the second heat exchanger; and an outdoor cooling unit, which comprises:
a third heat exchanger connected to the first heat exchanger and the second heat exchanger through at least one of the connecting pipes, the third heat exchanger being positioned out of the main casing and expose to ambient environment; and
a third fan supported in vicinity of the third heat exchanger for drawing ambient air to flow through the third heat exchanger;

wherein air is arranged to enter the air inlet channel through the air inlet, the air passing through the air inlet being bifurcated to pass through the first outlet conduit and the second outlet conduit through the air passage, the air in the first outlet conduit being arranged to sequentially flow through the second heat exchanger and the first portion of the first heat exchanger, the air in the second outlet conduit being arranged to flow through the second portion of the first heat exchanger, wherein a predetermined amount of refrigerant is arranged to leave the compressor and enter the first heat exchanger for releasing heat to the air passing therethrough, the refrigerant leaving the first heat exchanger being arranged to enter the third heat exchanger for further releasing heat to ambient environment, the refrigerant leaving the third heat exchanger being arranged to enter the second heat exchanger for absorbing a predetermined amount of heat from the air passing therethrough so as to remove a predetermined amount of water from the air passing through the second heat exchanger.

This summary presented above is provided merely to introduce certain concepts and not to identify any key or essential features of the claimed subject matter.

DETAILED DESCRIPTION OF THE PREFERRED EMBODIMENT

Figure 1:
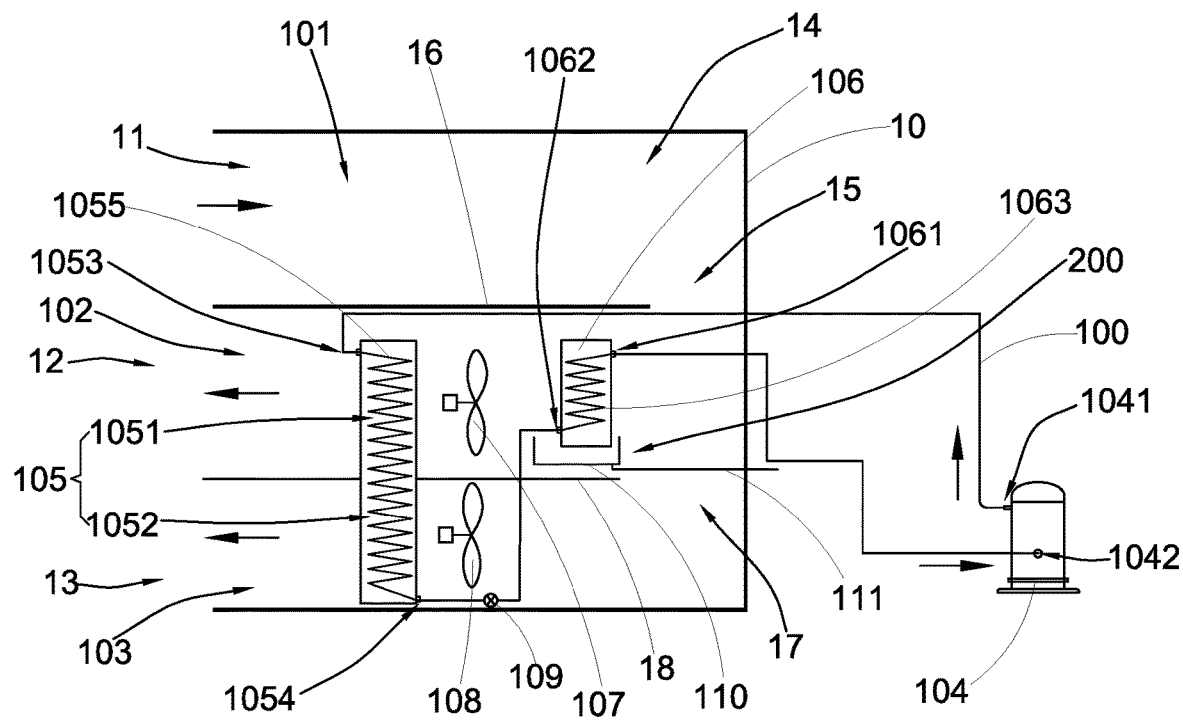
FIG. 1 is a schematic diagram of a heat pump dryer according to a first preferred embodiment of the present invention.

The following detailed description of the preferred embodiment is the preferred mode of carrying out the present disclosure. The description is not to be taken in any limiting sense. It is presented for the purpose of illustrating the general principles of embodiments of the present disclosure.

It should be appreciated that the terms "install", "connect", "couple", and "mount" in the following description refer to the connecting relationship in the accompanying drawings for easy understanding of embodiments of the present disclosure. For example, the connection can refer to permanent connection or detachable connection or connection through connecting pipes. Furthermore, "connected" may also mean direct connection or indirect connection, or connection through other auxiliary components. Therefore, the above terms should not be an actual connection limitation of the elements of embodiments of the present disclosure.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of embodiments of the present disclosure without limiting the actual location or orientation of embodiments of the present disclosure. Therefore, the above terms should not be an actual location limitation of the elements of embodiments of the present disclosure.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of embodiments of the present disclosure.

Referring to FIG. 1 to FIG. 4 of the drawings, a heat pump dryer according to a first preferred embodiment of the present disclosure is illustrated. Broadly, the heat pump dryer may comprise a plurality of connecting pipes 100 for allowing heat exchange medium to pass therethrough, a main casing 10, a compressor 104, a first heat exchanger 105, a second heat exchanger 106, a first fan 107, a second fan 108, and a water discharge arrangement 200. A predetermined amount of refrigerant as the heat exchange medium may be circulated through the connecting pipes 100 and the various components of the present invention.

The main casing 10 may have an air inlet 11, a first air outlet 12, a second air outlet 13, a heat exchanging compartment 14, and an air passage 15. The main casing 10 may comprise a partitioning member 16 provided in the heat exchanging compartment 14 to divide the heat exchanging compartment 14 into an air inlet channel 101 and an air outlet channel 17, and an air outlet divider 18 provided in the air outlet channel 17 to divide the air outlet channel 17 into a first outlet conduit 102 and a second outlet conduit 103, wherein the air inlet channel 101 may communicate with the air inlet 11 while the first outlet conduit 102 and the second outlet conduit 103 may communicate with the first air outlet 12 and the second air outlet 13 respectively. The air inlet channel 101 may communicate with the air outlet channel 17 through the air passage 15.

The first heat exchanger 105 may be provided in the heat exchanging compartment 14 of the main casing 10 and connected to the compressor 104 through at least one of the connecting pipes 100. The first heat exchanger 105 may have a first portion 1051 exposed to the first outlet conduit 102, and a second portion 1052 exposed to the second outlet conduit 103.

The second heat exchanger 106 may be connected to the compressor 104 and the first heat exchanger 105 through at least one of the connecting pipes 100. The second heat exchanger 106 may be positioned in the first outlet conduit 102 adjacent to the first portion 1051 of the first heat exchanger 105 and between the first heat exchanger 105 and the air passage 15.

The first fan 107 and the second fan 108 may be provided in the first outlet conduit 102 and the second outlet conduit 103 respectively for drawing air flowing from the air inlet 11 to the first air outlet 12 and the second air outlet 13 respectively.

The water discharge arrangement 200 may be supported in the air outlet channel 17 and communicate with the second heat exchanger 106 for collecting and discharging residual or condensate water formed on the second heat exchanger 106.

Air is arranged to enter the air inlet channel 101 through the air inlet 11. The air passing through the air inlet 11 may be bifurcated and enter the first outlet conduit 102 and the second outlet conduit 103 through the air passage 15. The air in the first outlet conduit 102 may be arranged to sequentially flow through the second heat exchanger 106 and the first portion 1051 of the first heat exchanger 105. The air in the second outlet conduit 103 may be arranged to flow through the second portion 1052 of the second heat exchanger 105.

At the same time, a predetermined amount of refrigerant is arranged to leave the compressor 104 and enter the first heat exchanger 105 for releasing heat to the air passing therethrough. The refrigerant leaving the first heat exchanger 105 may be arranged to enter the second heat exchanger 106 for absorbing a predetermined amount of heat to the air passing therethrough so as to remove a predetermined amount of water from the air passing through the second heat exchanger 106.

According to the first preferred embodiment of the present invention, the heat pump dryer is for drying a wide variety of objects, such as agricultural products, herbal products, or even soils. The main casing 10 may communicate with a dryer housing 126 which accommodate the products to be dried.

As shown in FIG. 1 of the drawings, the air inlet channel 101 and the air outlet channel 17 may be arranged in an up-down manner. A particular configuration may be that the air inlet channel 101 may be positioned above the air outlet channel 17. On the other hand, the compressor 104 may have a compressor outlet 1041 and a compressor inlet 1042 and may be positioned outside the main casing 10. A predetermined amount of refrigerant may circulate between the compressor 104, the first heat exchanger 105 and the second heat exchanger 106 through the connecting pipes 100.

The first heat exchanger 105 may have a first connecting port 1053 and a second connecting port 1054 provided on the first portion 1051 and the second portion 1052 respectively, wherein refrigerant may enter or exit the first heat exchanger 105 through either the first connecting port 1053 or the second connecting port 1054. The first connecting port 1053 may be connected to the compressor outlet 1041 through at least one of the connecting pipes 100, while the second connecting port 1054 may be connected to the second heat exchanger 106 also through at least one of the connecting pipes 100.

The second heat exchanger 106 may have a first communication port 1061 and a second communication port 1062, wherein refrigerant may enter or exit the second heat exchanger 106 through either the first communication port 1061 or the second communication port 1062. The first communication port 1061 may be connected to the compressor inlet 1042 through at least one of the connecting pipes 100. The second communication port 1062 may be connected to the second connecting port 1054 of the first heat exchanger 105 through at least one of the connecting pipes 100.

Figure 2:
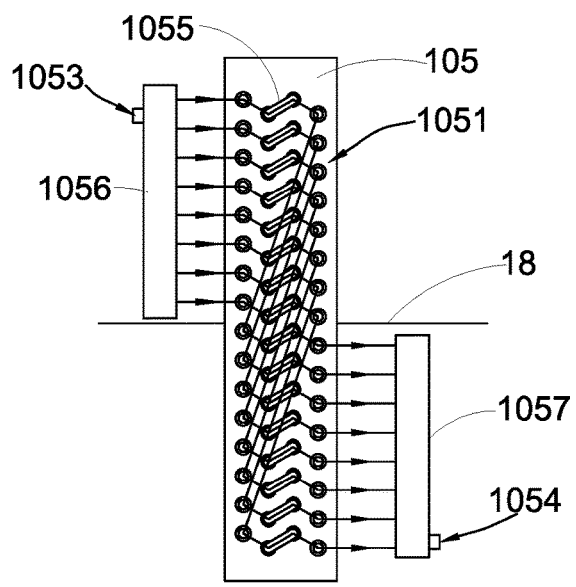
FIG. 2 is a schematic diagram of a first heat exchanger of the heat pump dryer according to the first preferred embodiment of the present invention.

Referring to FIG. 2 of the drawings, each of the first heat exchanger 105 and the second heat exchanger 106 may facilitate heat exchange between refrigerant and air. Thus, the first heat exchanger 105 may comprise a plurality of first heat exchanging pipes 1055 connecting the first connecting port 1053 and the second connecting port 1054, while the second heat exchanger 106 may comprise a plurality of second heat exchanging pipes 1063 connecting the first communication port 1061 and the second communication port 1062. Refrigerant may pass through the first heat exchanging pipes 1055 and the second heat exchanging pipes 1063 for absorbing or releasing heat to the air flowing through the first heat exchanger 105 and the second heat exchanger 106.

Each of the first heat exchanging pipes 1055 may extend from the first outlet conduit 102 to the second outlet conduit 103 so that refrigerant flowing through the first heat exchanging pipes 1055 may travel from the first outlet conduit 102 to the second outlet conduit 103. Each of the first heat exchanging pipes 1055 may be connected to a first main collection pipe 1056 and a second main collection pipe 1057, wherein the first connecting port 1053 and the second connecting port 1054 may be provided on the first main collection pipe 1056 and the second main collection pipe 1057 respectively.

As shown in FIG. 2 of the drawings, each of the first heat exchanging pipes 1055 may extend from the first portion 1051 toward the second portion 1052 in such a manner that at least some portions of the first heat exchanging pipes 1055 extend at an orientation which is substantially opposite to the direction of air flow in the first outlet conduit 102 and the second outlet conduit 103. Specifically, each of the first heat exchanging pipes 1055 may extend from one side of the first portion 1051 and extend toward the opposite side of the first portion 1051 along a longitudinal direction of the first outlet conduit 102. After that, the corresponding heat exchanging pipe 1055 may extend from along a transverse direction of the main casing 10 toward the second portion 1052 of the first heat exchanger 105. In the second portion 1052, each of the first heat exchanging pipes 1055 may extend from one side (which is the same side as the starting point of the first heat exchanging pipe 1055 in the first portion 1051) of the second portion 1052 and extend toward the opposite side of the second portion 1052 along a longitudinal direction of the second outlet conduit 103.

As such, the refrigerant passing through the first heat exchanging pipes 1055 may travel in a direction which is substantially opposite to the direction of air flow in the first outlet conduit 102 and the second outlet conduit 103. This configuration of extension of the first heat exchanging pipes 1055 may allow maximum heat exchange efficiency between the refrigerant and the air flowing through the first outlet conduit 102 and the second outlet conduit 103. Thus, one may appreciate that each of the first exchanging pipes 1055 may have some portions extending from left to right in FIG. 2 of the drawings, while the air in the first outlet conduit 102 and the second outlet conduit 103 may flow from the right to the left with reference to FIG. 2 of the drawings.

Figure 3:
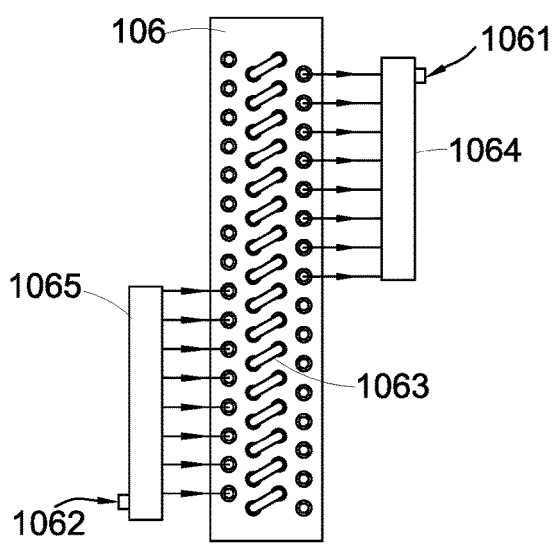
FIG. 3 is a schematic diagram of a second heat exchanger of the heat pump dryer according to the first preferred embodiment of the present invention.

Referring to FIG. 3 of the drawings, each of the second heat exchanging pipes 1063 may extend in the first outlet conduit 102. Each of the second heat exchanging pipes 1063 may be connected to a third main collection pipe 1064 and a fourth main collection pipe 1065, wherein the first communication port 1061 and the second communication port 1062 may be provided on the third main collection 1064 and fourth main collection pipe 1065 respectively. Each of the second heat exchanging pipes 1063 may also extend in the manner identical to the first heat exchanging pipes 1055.

The heat pump dryer may further comprise a flow regulator 109 connected between the second connecting port 1054 and the second communication port 1062 for regulating a flow rate of the refrigerant passing between them. The flow regulator 109 may be configured as a valve, and may be positioned in the second outlet conduit 103.

When the heat pump dryer of the present invention is operated, a predetermined amount of refrigerant may be circulated between the compressor 104, the first heat exchanger 105, and the second heat exchanger. On the other hand, air may flow between the dryer housing 126 and the main casing 10. Specifically, vaporous refrigerant may be arranged to leave the compressor 104 through the compressor outlet 1041 and enter the first portion 1051 of the first heat exchanger 105 through the first connecting port 1053.

The refrigerant may then travel through the first portion 1051 toward the second portion 1052 and perform heat exchange with the air passing through the first outlet conduit 102 and the second outlet conduit 103 and release heat thereto. The refrigerant may then leave the first heat exchanger 105 through the second connecting port 1054. Thus, the first heat exchanger 105 may act as a condenser.

The refrigerant leaving the first heat exchanger 105 may be arranged to pass through the flow regulator 109 and enter the second heat exchanger 106 through the second communication port 1062. The refrigerant in the second heat exchanger 106 may be arranged to perform heat exchange with the air passing therethrough in the first outlet conduit 102. The refrigerant may be arranged to absorb a certain amount of heat from the air passing through the second heat exchanger 106 for removing water contents (i.e. dehumidifying) from the air. Thus, the second heat exchanger 106 may act as an evaporator.

The refrigerant may then be arranged to leave the second heat exchanger 106 through the first communication port 1061 and flow back to the compressor 104 through the compressor inlet 1041 to complete a refrigeration cycle.

The purpose of dehumidifying by the second heat exchanger 106 is to remove water contents from the air. As such, the air flowing through the first portion 1051 of the first heat exchanger 105 may contain less water contents. Moreover, the second heat exchanger 106 may absorb a certain amount of heat from the air so as to lower the temperature of the air feeding to the first portion 1051 of the first heat exchanger 105. Therefore heat exchange efficiency between the air passing through the first portion 1051 and the refrigerant flowing through the first portion 1051 may be maximized because the temperature difference between the air flowing through the first portion 1051 and the refrigerant passing through the first portion 1051 will be greater (as compared to the temperature difference between the air flowing through the second portion 1052 and the refrigerant passing through the first portion 1052). When the temperature of the air flowing through the second heat exchanger 106 decreases, condensate or residual water may be formed on the exterior surface of the second heat exchanger 106. The water may then be collected by the water discharge arrangement 200.

Thus, the air passing through the first outlet conduit 102 may be arranged to go through the dehumidifying process first before absorbing heat from the first portion 1051 of the first heat exchanger 105. On the other hand, the air flowing through the second outlet conduit 102 may be arranged to only pass through the second portion 1052 of the first heat exchanger 105.

From the forgoing descriptions, one skilled in the art may appreciate that by suitably adjusting the flow rate of the air in the first outlet conduit 102 and the second outlet conduit 103, the air going out of the first air outlet 12 and the second air outlet 13 may have different humidity and temperature for suiting different drying needs. The flow rate of the air in the first outlet conduit 102 and the second outlet conduit 103 may be adjusted by adjusting the speed of the first fan 107 and the second fan 108.

The water discharge arrangement 200 may comprise a water collection tray 110 provided in the first outlet conduit 102 at a position underneath the second heat exchanger 106 for collecting condensate or residual water therefrom. The water discharge arrangement 200 may further comprise a water guiding tube 111 extended from the water collection tray 110 to an exterior of the main casing 10 so as to guide the water collected in the water collection tray 110 to be discharged out of the main casing 10.

Since the second heat exchanger 106 may be utilized to absorb heat from the air passing therethrough, as a result, water contents in the air may be condensed and formed on an outer surface of the second heat exchanger 106. The water may then drop to the water collection tray 110 and may be eventually guided to discharge out (or pumped out through a water pump) of the main casing 10.

Moreover, the outlet divider 18 may be movably mounted in the air outlet channel 17 so as to alter the relative size/volume of the first outlet conduit 102 and the second outlet conduit 103. The outlet divider 18 may be movably mounted to the air casing 10 or the first heat exchanger 105 in such a manner that the outlet divider 18 may move along a longitudinal direction of the first heat exchanger 105. With reference to FIG. 1 of the drawings, the outlet divider 18 may move up or down along the longitudinal direction of the first heat exchanger 105 so as to define the first outlet conduit 102 and the second outlet conduit 103. Furthermore, by moving the outlet divider 18, the first portion 1051 and the second portion 1052 may also be defined by the outlet divider 18. In other words, the outlet divider may define the first portion 1051 of the first heat exchanger 105 as that portion of the first heat exchanger which is above (or at one side of) the outlet divider 18. Conversely, the outlet divider may define the second portion 1052 of the first heat exchanger 105 as that portion of the first heat exchanger 105 which is below (or at the other side of) the outlet divider 18. As such, the heat exchange surface area between the first portion 1051 and the air flowing in the first outlet conduit 102, and the heat exchange surface area between the second portion 1052 and the air flowing in the second outlet conduit 103 may be optimally adjusted by movably adjusting the position of the outlet divider 18. The position of the outlet divider 18 may be controlled by conventional mechanical methods or by electronic methods.

Figure 4:
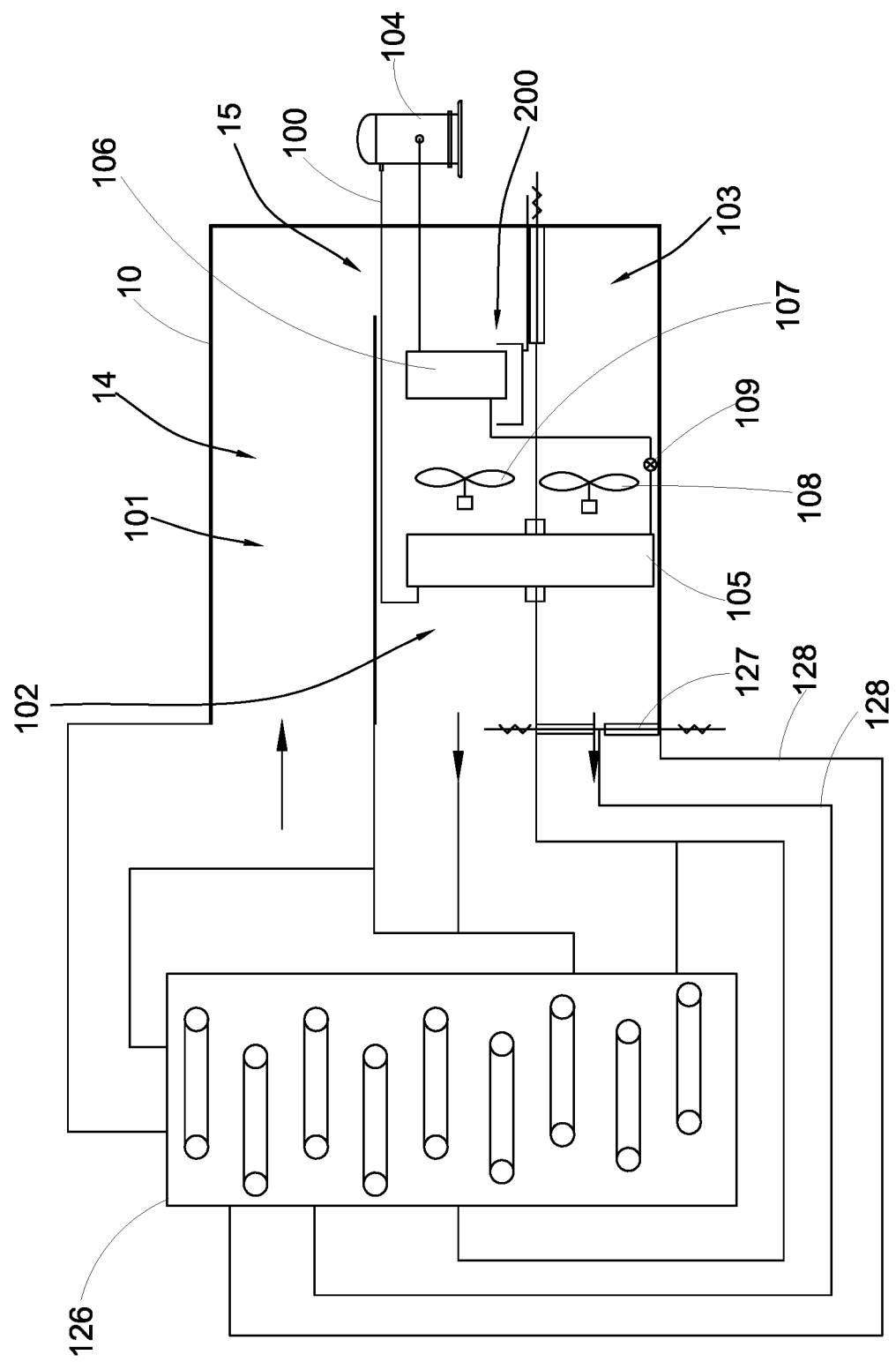
FIG. 4 is a schematic diagram of a heat pump dryer according to the first preferred embodiment of the present invention, illustrating the heat pump dryer is communicating with a dryer housing.

As shown in FIG. 4 of the drawings, the heat pump dryer of described above may be part of a drying system which may comprise the heat pump dryer of the present invention, and a dryer housing 126. The dryer housing 126 may accommodate the items which need to be dried. The dryer housing 126 may communicate with the air inlet channel 101, the first outlet conduit 102 and the second outlet conduit 103. Air may circulate between the dryer housing 126 and the heat pump dryer of the present invention.

In order to regulate flow of air from the heat pump dryer to the dryer housing 126, the heat pump dryer may further comprise an flow regulating valve 127 provided on at least one of the first outlet conduit 102 and the second outlet conduit 103 for regulating a flow rate of the air flowing to the dryer housing 126. Moreover, the heat pump dryer and the dryer housing 126 may be connected through a plurality of air supply channels 128. These air supply channels 128 may communicate with the first outlet conduit 102 or the second outlet conduit 103. The flow regulating valve 127 may facilitate communication between one or more of the air supply channels 128 to either the first outlet conduit 102 and the second outlet conduit 103, depending on the circumstances in which the present invention is to be utilized.

Figure 5:
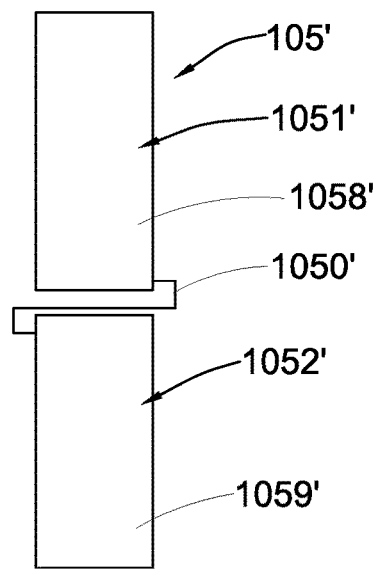
FIG. 5 is a schematic diagram of an alternative configuration of the first heat exchanger of the heat pump dryer according to the first preferred embodiment of the present invention.

FIG. 5 illustrates an alternative configuration of the first heat exchanger 105' in which the first heat exchanger 105' may comprise a first sub heat exchanger 1058' and a second sub heat exchanger 1059', wherein the first portion 1051' and the second portion 1052' may be formed in the first sub heat exchanger 1058' and the second sub heat exchanger 1059' respectively. The first sub heat exchanger 1058' and the second sub heat exchanger 1059' may be connected by a first joining pipe 1050'. The first heat exchanging pipes 1055' may extend in the first sub heat exchanger 1058' and the second sub heat exchanger 1059' and may be connected by the first joining pipe 1050'. Thus, in this alternative configuration, the first heat exchanger 105' may be divided into two separate components and refrigerant may flow from the first sub heat exchanger 1058' toward the second sub heat exchanger 1059' through the first joining pipe 1050'.

Figure 6:
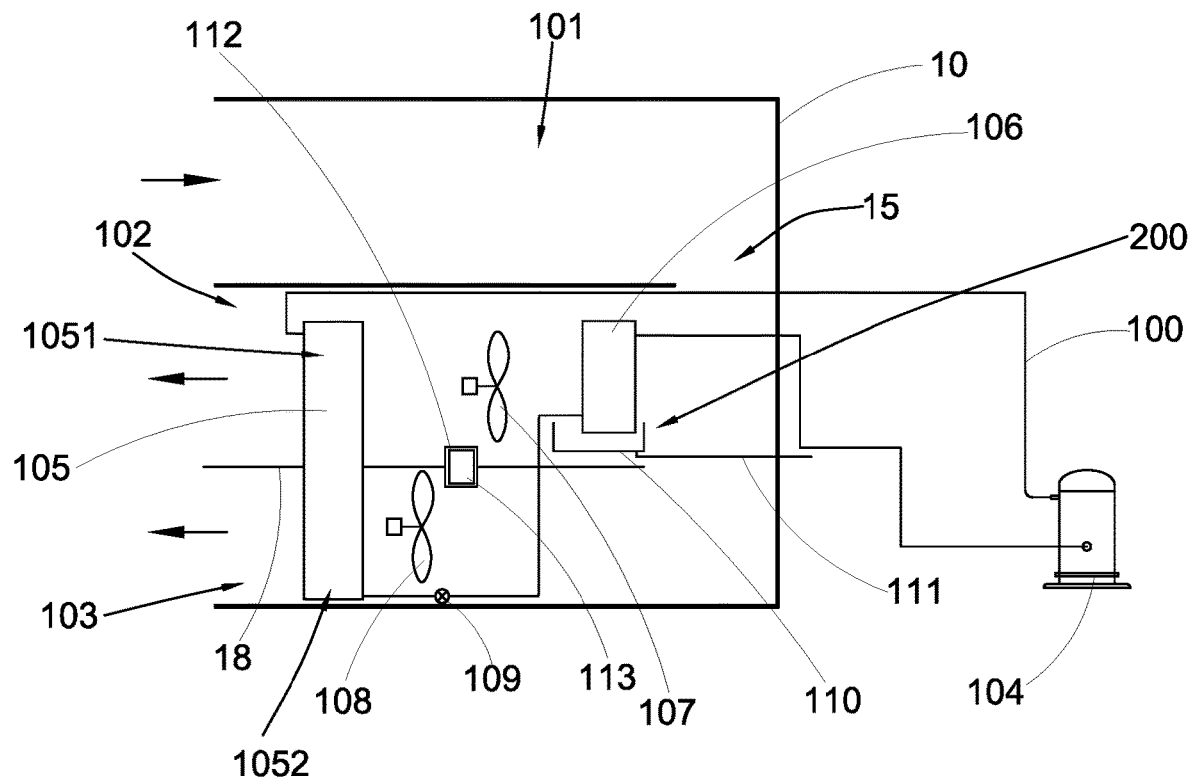
FIG. 6 is a schematic diagram of a first alternative mode of the heat pump dryer according to the first preferred embodiment of the present invention.

Referring to FIG. 6 of the drawings, a first alternative mode of the first preferred embodiment of the present invention is illustrated. The first alternative mode is similar to what was disclosed in the first preferred embodiment described above, except the air outlet divider 18 may further have a ventilating window 112 formed thereon for communicating the first outlet conduit 102 with the second outlet conduit 103. The ventilating window 112 may allow air from the first outlet conduit 102 to flow to the second outlet conduit 103 or vice versa. The ventilating window 112 may be positioned between the first heat exchanger 105 and the second heat exchanger 106.

The purpose of the ventilating window 112 is to allow a certain amount of air flowing through the first outlet conduit 102 to mix with the air flowing through the second outlet conduit 103. On the one hand, due to the presence of the ventilating window 112, the flow rate of the air flowing from the second heat exchanger 106 toward the first portion 1051 of the first heat exchanger 105 may be reduced so as to increase the heat transfer performance between the air and the refrigerant flowing through the first portion 1051 of the first heat exchanger 105. This has the result of decreasing the humidity of the air flowing in the first outlet conduit and increasing the temperature of the air flowing through the first air outlet 12.

On the other hand, the provision of the ventilating window 112 may allow a certain amount of air flowing through the second outlet conduit 103 to enter the first outlet conduit 102. Since the air flowing through the second air outlet conduit 103 has not been dehumidified by the second heat exchanger 106, the mixing of two streams of air may allow a user of the present invention to optimally and flexibly adjust the humidity and temperature of the air flowing through the first air outlet 12.

Furthermore, the heat pump dryer may further comprise an air flow guider 113 supported by the air outlet divider 18 and arranged to regulate a flow rate of the air flowing through the ventilating window 112. The air flow guider 113 may be configured as an air flow valve mounted at the ventilating window 112 for controlling the flow rate and the primary direction of the air flowing between the first outlet conduit 102 and the second outlet conduit 103.

As shown in FIG. 6 of the drawings, the ventilating window 112 may be provided between the first fan 107 and the first portion 1051 of the first heat exchanger 105 while the second fan 108 may be positioned between the ventilating window 112 and the second portion 1052 of the first heat exchanger 105. In this configuration, some of the air flowing through the first fan 107 may be guided to enter the second outlet conduit 103 through the ventilating window 112, subject to the flow rate control of the air flow guider 113.

Figure 7:
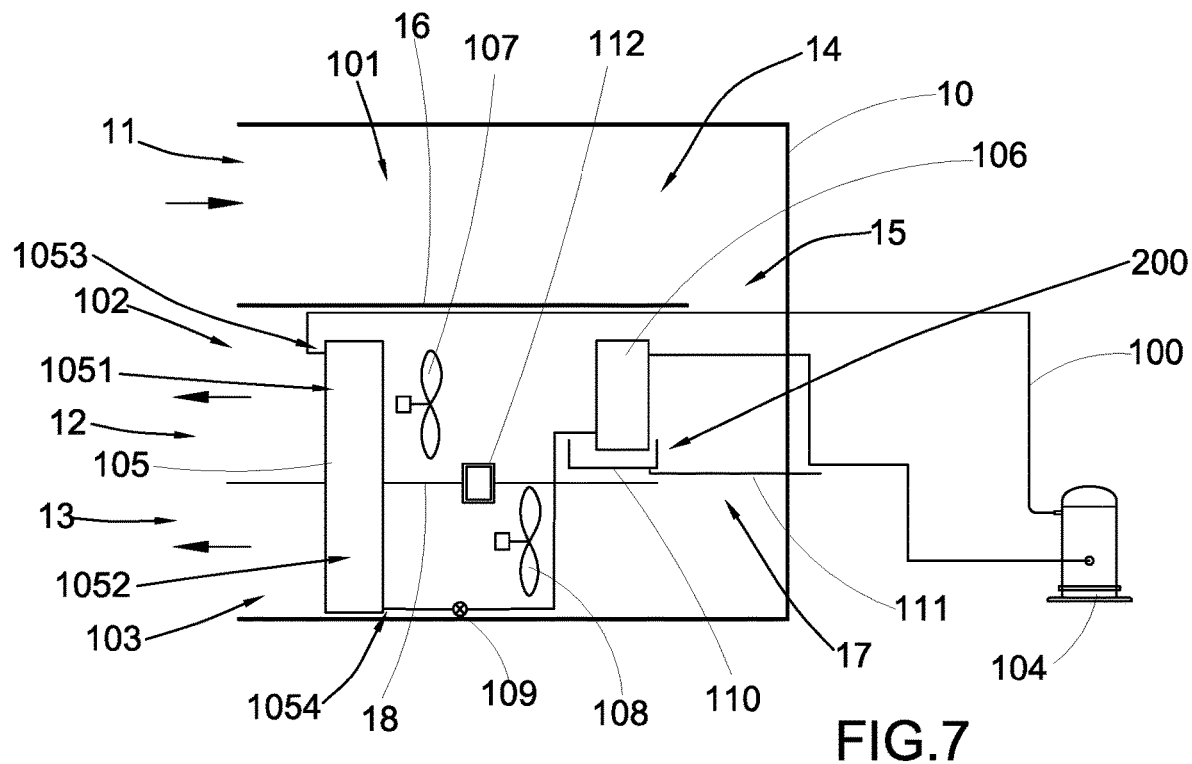
FIG. 7 is a schematic diagram of a second alternative mode of the heat pump dryer according to the first preferred embodiment of the present invention.

Alternatively, as shown in FIG. 7 of the drawings, as a second alternative mode of the present invention, the ventilating window 112 may be positioned between the first fan 107 and the second heat exchanger 106, while the first fan 107 may be positioned adjacent to the first portion 1051 of the first heat exchanger 105. On the other hand, the ventilating window 112 may be positioned between the second fan 108 and the second portion 1052 of the first heat exchanger 105.

Figure 8:
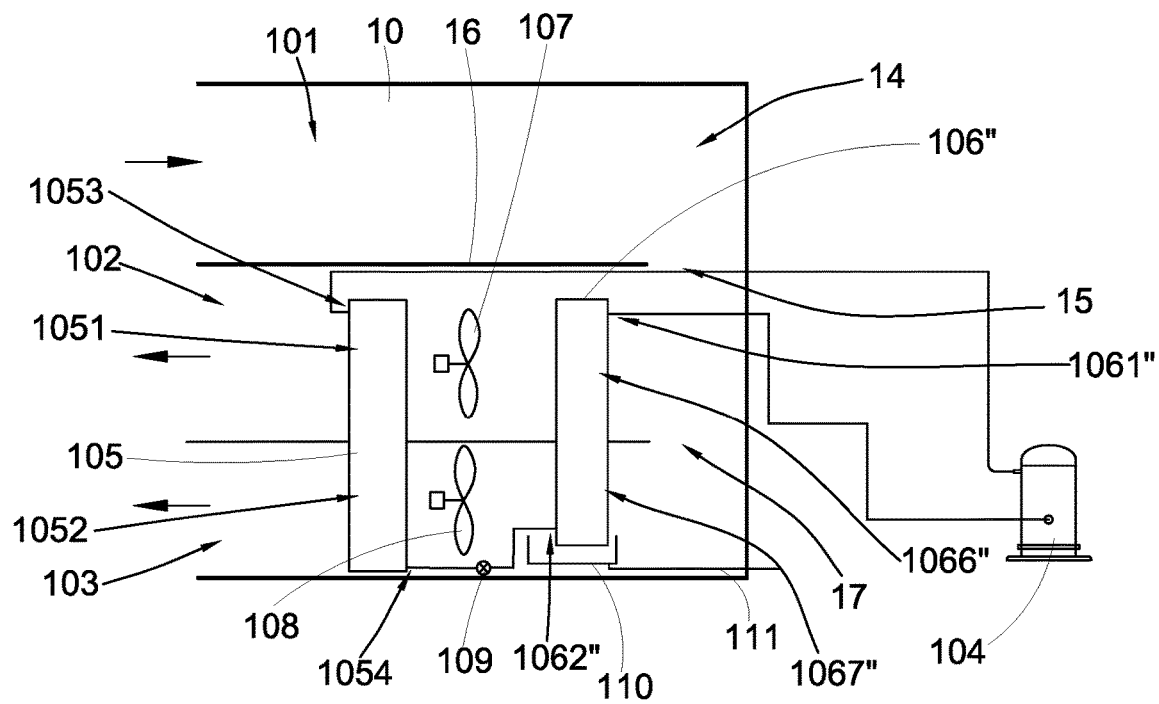
FIG. 8 is a schematic diagram of a third alternative mode of the heat pump dryer according to the first preferred embodiment of the present invention.

Referring to FIG. 8 of the drawings, a third alternative mode of the heat pump dryer according to the preferred embodiment of the present invention is illustrated. The third alternative mode is similar to the preferred embodiment described above, except that the second heat exchanger 106" may be structurally identical to the first heat exchanger 105 described in the preferred embodiment. Thus, in this third alternative mode, the second heat exchanger 106" may have a third portion 1066" and a fourth portion 1067" exposed to the first outlet conduit 102, and the second outlet conduit 103 respectively, wherein the first communication port 1061" may be provided on the third portion 1066" while the second communication port 1062" may be provided on the fourth portion 1067".

Figures 9, 10:
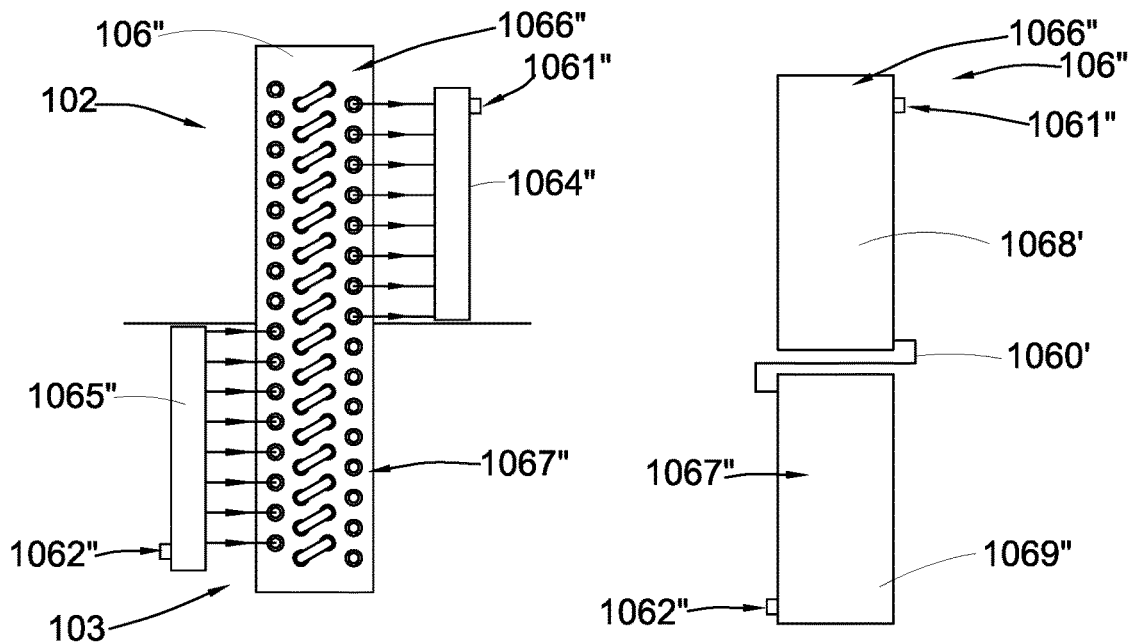
FIG. 9 is a schematic diagram of a second heat exchanger of the heat pump dryer according to the third alternative mode of the preferred embodiment of the present invention.
FIG. 10 is an alternative configuration of the second heat exchanger of the heat pump dryer according to the third alternative mode of the preferred embodiment of the present invention.

As shown in FIG. 9 of the drawings, the third portion 1066" may be positioned in the first outlet conduit 102" between the first fan 107 and the air passage 15. The fourth portion 1067" may be positioned in the second outlet conduit 103" between the second fan 108 and the air passage 15. Air from the air inlet channel 101 may be arranged to pass through the third portion 1066" and the fourth portion 1067" through the air passage 15.

On the other hand, refrigerant leaving from the compressor 104 may be arranged to enter the first heat exchanger 105 in the manner described in the preferred embodiment above, and then arranged to enter the fourth portion 1067" of the second heat exchanger 106" through the second communication port 1062". The refrigerant may then be arranged to travel from the fourth portion 1067" to the third portion 1066" for absorbing heat from the air flowing in the first outlet conduit 102 and the second outlet conduit 103. The air passing through the second heat exchanger 106" may be cooled and condensate or residual water may be formed on an external surface of the second heat exchanger 106".

In this third alternative mode, the water discharge arrangement 200 may be provided in the second outlet conduit 103 in such a manner that the water collection tray 110 may be positioned underneath the fourth portion 1067" while the water guiding tube 111 may extend out of the main casing 10 from the water collection tray 110, as shown in FIG. 8 of the drawings.

The flow regulator 109 may be connected between the second communication port 1062" on the fourth portion 1067" and the second connecting port 1054 on the second portion 1052 of the first heat exchanger 105. In order to optimize the temperature and humidity of the air going out of the first outlet conduit 102 and the second outlet conduit 103, a speed of the first fan 107 and the second fan 108 may be adjusted so as to adjust the flow rate of the air passing through the third portion 1066" and the fourth portion 1067".

Note that in this third alternative mode, the second heat exchanger 106" may be structurally identical to the first heat exchanger 105 described in the preferred embodiment above. Thus, as shown in FIG. 9 of the drawings, each of the second heat exchanging pipes 1063" may extend from the second outlet conduit 103 to the first outlet conduit 102 so that refrigerant flowing through the second heat exchanging pipes 1063" may travel from the second outlet conduit 103 to the first outlet conduit 102. Each of the second heat exchanging pipes 1063" may be connected to a third main collection pipe 1064" and a fourth main collection pipe 1065", wherein the first communication port 1061" and the second communication port 1062" may be provided on the third main collection pipe 1064" and the fourth main collection pipe 1065" respectively.

As shown in FIG. 10 of the drawings, the second heat exchanger 106" may also resemble the structure of the first heat exchanger 105 shown in FIG. 4 of the drawings. Thus, the second heat exchanger 106" may comprise a third sub heat exchanger 1068" and a fourth sub heat exchanger 1069", wherein the third portion 1066" and the fourth portion 1067" may be formed in the third sub heat exchanger 1068" and the fourth sub heat exchanger 1069" respectively.

The third sub heat exchanger 1068" and the fourth sub heat exchanger 1069" may be connected by a second joining pipe 1060". The second heat exchanging pipes 1063" may extend in the third sub heat exchanger 1068" and the fourth sub heat exchanger 1069" and may be connected by the second joining pipe 1060". Thus, in this configuration, the second heat exchanger 106" may be divided into two separate components and refrigerant may flow from the fourth sub heat exchanger 1069" toward the third sub heat exchanger 1068" through the second joining pipe 1060".

It is worth mentioning that when each of the first heat exchanger 105" and the second heat exchanger 106" both have two portions such as that shown in FIG. 8 of the drawings, the air outlet divider 18 may be moved in the air outlet channel 17 in a manner described in the first preferred embodiment above. When the air outlet divider 18 moves in the air outlet channel 17, the relative volume of the first outlet conduit 102 and the second outlet conduit 103 may be varied so that the heat exchange surface area between the first portion 1051 and the third portion 1066" and the air flowing through the first outlet conduit 102 may be adjusted. Similarly, the heat exchange surface area between the second portion 1052 and the fourth portion 1067" and the air flowing through the second outlet conduit 103 may also be correspondingly adjusted.

Figure 11:
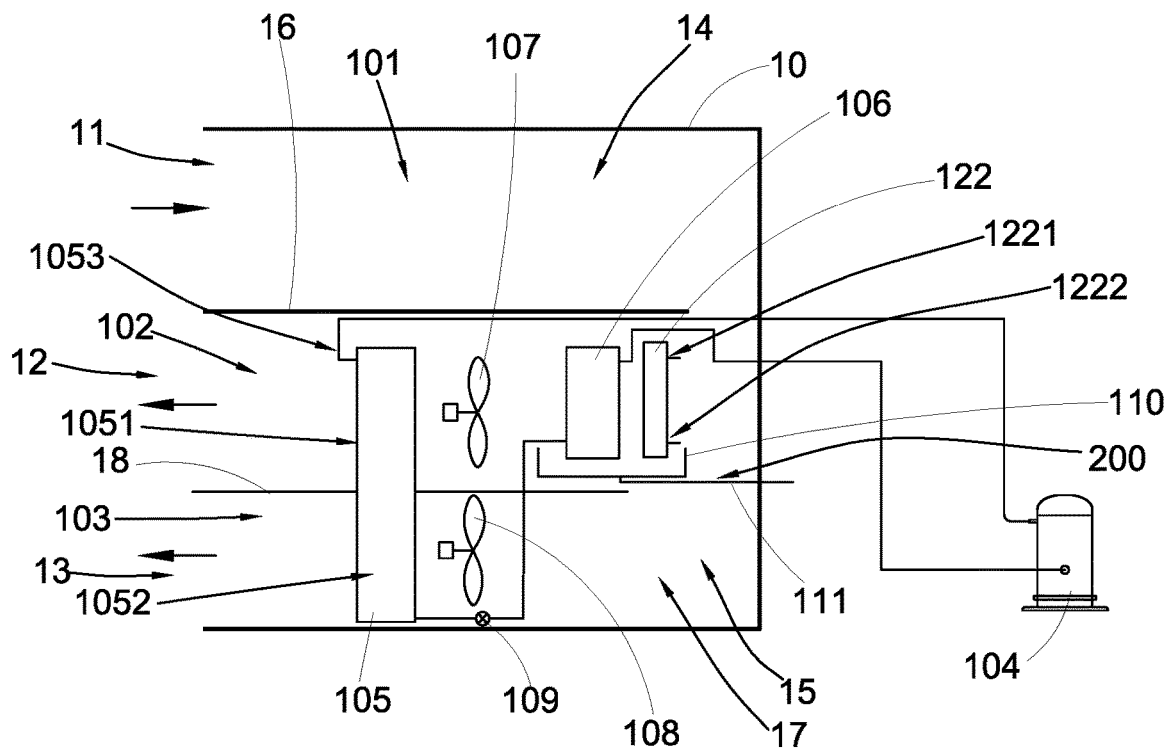
FIG. 11 is a fourth alternative mode of the heat pump dryer according to the first preferred embodiment of the present invention.

Referring to FIG. 11 of the drawings, a fourth alternative mode of the heat pump dryer according to the first preferred embodiment of the present invention is illustrated. The fourth alternative mode is identical to the heat pump dryer disclosed in FIG. 1 above, except the heat pump dryer may further comprise an auxiliary heat exchanger 122 provided in the first outlet conduit 102 and positioned between the second heat exchanger 106 and the air passage 15, so that air entering the first outlet conduit 102 from the air passage 15 may be arranged to flow through the auxiliary heat exchanger 122 first before flowing through the second heat exchanger 106.

The purpose of the auxiliary heat exchanger 122 may be to pre-cool the air flowing in the first outlet conduit 102 before the air reaches the second heat exchanger 106. Specifically, the auxiliary heat exchanger 122 may have a first passage port 1221 and a second passage port 1222, wherein a predetermined heat exchange medium, such as refrigerant or water, may enter or leave the auxiliary heat exchanger 122 through the first passage port 1221 and the second passage port 1222. The heat exchange medium flowing through the auxiliary heat exchanger 122 may be arranged to perform heat exchange with the air flowing in the first outlet conduit 102 for absorbing heat therefrom. The heat absorbed by the heat exchange medium may be dissipated to ambient environment or other cooling unit when the heat exchange medium leaves the auxiliary heat exchanger 122 through the second passage port 1222.

When cooling the air in the first outlet conduit 102, condensate or residual water may also be formed on the exterior surface of the auxiliary heat exchanger 122. Thus, the water collection tray 110 of the water discharge arrangement 200 may be sized and positioned to be disposed underneath the second heat exchanger 106 and the auxiliary heat exchanger 122. The water guiding tube 111 may extend from the water collection tray 110 to an outside of the main casing 10.

Figure 12:
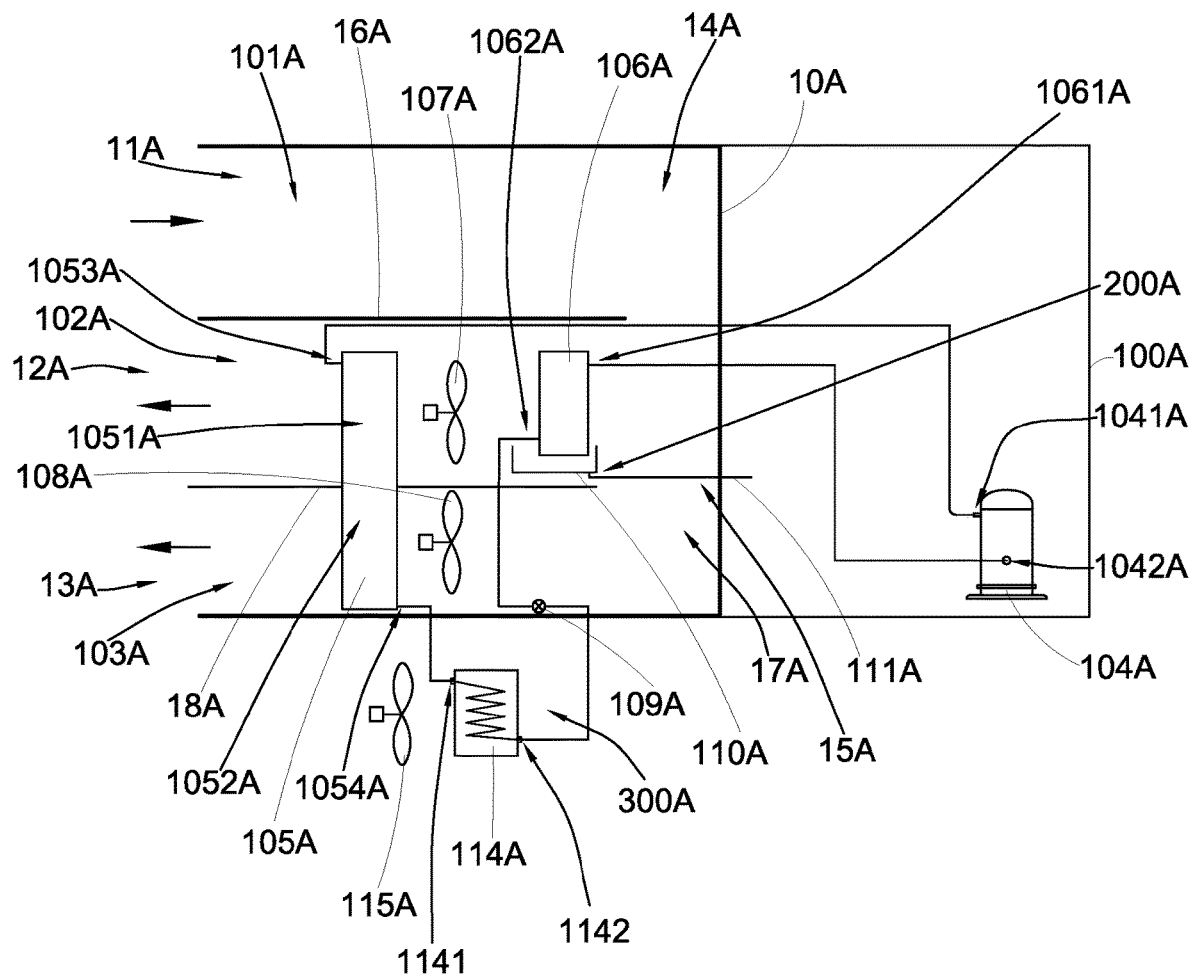
FIG. 12 is a schematic diagram of a heat pump dryer according to a second preferred embodiment of the present invention.

Referring to FIG. 12 of the drawings, a heat pump dryer according to a second preferred embodiment of the present invention is illustrated. The second preferred embodiment is similar to the preferred embodiment shown in FIG. 1 of the drawings, except the heat pump dryer may further comprise an outdoor cooling unit 300A. The outdoor cooling unit 300A may comprise a third heat exchanger 114A and a third fan 115A. The third heat exchanger 114A may be connected between the first heat exchanger 105A and the second heat exchanger 106A through at least one of the connecting pipe 100A, and may be positioned outside the air inlet channel 101A and the air outlet channel 17A.

Thus, according to the second preferred embodiment of the present invention, the heat pump dryer may comprise a plurality of connecting pipes 100A for allowing heat exchange medium such as refrigerant to pass therethrough, a main casing 10A, a compressor 104A having a compressor inlet 1042A and a compressor outlet 1041A, a first heat exchanger 105A, a second heat exchanger 106A, a first fan 107A, a second fan 108A, a water discharge arrangement 200A, and an outdoor cooling unit 300A communicated with the second heat exchanger 106A.

The main casing 10A may have an air inlet 11A, a first air outlet 12A, a second air outlet 13A, a heat exchanging compartment 14A, and an air passage 15A. The main casing 10A may comprise a partitioning member 16A provided in the heat exchanging compartment 14A to divide the heat exchanging compartment 14A into an air inlet channel 101A and an air outlet channel 17A, and an air outlet divider 18A provided in the air outlet channel 17A to divide the air outlet channel 17A into a first outlet conduit 102A and a second outlet conduit 103A, wherein the air inlet channel 17A may communicate with the air inlet 11A while the first outlet conduit 102A and the second outlet conduit 103A may communicate with the first air outlet 12A and the second air outlet 13A respectively. The air inlet channel 101A may communicate with the air outlet channel 17A through the air passage 15A.

The first heat exchanger 105A may be provided in the heat exchanging compartment 14A of the main casing 10A and may be connected to the compressor 104A through at least one of the connecting pipes 100A. The first heat exchanger 105A may have a first portion 1051A exposed to the first outlet conduit 102A, and a second portion 1052A exposed to the second outlet conduit 103A.

The second heat exchanger 106A may be connected to the compressor 104A and the first heat exchanger 105A through at least one of the connecting pipes 100A. The second heat exchanger 106A may be positioned in the first outlet conduit 102A adjacent to the first portion 1051A of the first heat exchanger 105A and between the first heat exchanger 105A and the air passage 15A.

The first fan 107A and a second fan 108A may be provided in the first outlet conduit 102A and the second outlet conduit 103A respectively.

The third heat exchanger 114A may be connected to the first heat exchanger 105A and the second heat exchanger 106A through at least one of the connecting pipes 100A. The third heat exchanger 114A may be positioned out of the main casing 10A and expose to ambient environment. The third fan 115A may be supported in vicinity of the third heat exchanger 114A for drawing ambient air to flow through the third heat exchanger 114A.

In this second preferred embodiment, the third heat exchanger 114A may have a first refrigerant port 1141A, a second refrigerant port 1142A, and a plurality of third heat exchanging pipes 1143A extended between the first refrigerant port 1141A and the second refrigerant port 1142A. Refrigerant may enter and exit the third heat exchanger 114A through the first refrigerant port 1141A and the second refrigerant port 1142A. The structure of the third heat exchanger 114A resembles that of the second heat exchanger 106 disclosed in the first preferred embodiment above.

Air may be arranged to enter the air inlet channel 101A through the air inlet 11A. The air passing through the air inlet channel 101A may be bifurcated to pass through the first outlet conduit 102A and the second outlet conduit 103A through the air passage 15A. The air in the first outlet conduit 102A may be arranged to sequentially flow through the second heat exchanger 106A and the first portion 1051A of the first heat exchanger 105A, whereas the air in the second outlet conduit 103A may be arranged to flow through the second portion 1052A of the first heat exchanger 105A.

On the other hand, a predetermined amount of refrigerant is arranged to leave the compressor 104A and enter the first heat exchanger 105A for releasing heat to the air passing therethrough. The refrigerant leaving the first heat exchanger 105A may be arranged to enter the third heat exchanger 114A for further releasing heat to ambient environment. The refrigerant leaving the third heat exchanger 114A may be arranged to enter the second heat exchanger 106A for absorbing a predetermined amount of heat from the air passing therethrough so as to remove a predetermined amount of water from the air passing through the second heat exchanger 106A.

According to the second preferred embodiment of the present invention, the first heat exchanger 105A, the second heat exchanger 106A, the compressor 104A, the first fan 107A, the second fan 108A and the main housing 10A may be structurally identical to what has been disclosed in the first preferred embodiment and its alternative modes above.

Furthermore, the first refrigerant port 1141A may be connected to the second connecting port 1054A of the first heat exchanger 105A, while the second refrigerant port 1142A may be connected to the second communication port 1062A of the second heat exchanger 106A and the flow regulator 109A. The third fan 115A may be positioned in a vicinity of the third heat exchanger 114A so as to supply air flow thereto. The third heat exchanger 114A may be arranged to perform heat exchange with the air flowing through the third heat exchanger 114A. In this second preferred embodiment, the third heat exchanger 114A may be positioned in ambient environment out of the main casing 10A.

The third heat exchanger 114A may act as an adjustment heat exchanger which may allow refrigerant to further release heat to ambient environment so as to maintain a temperature of the drying housing 126. Thus, refrigerant may leave the compressor 104A through the compressor outlet 1041A and enter the first portion 1051A of the first heat exchanger 105A through the first connecting port 1053A. The refrigerant may perform heat exchanger with the air flowing in the first outlet conduit 102A and the second outlet conduit 103A and release heat to the air flowing through the first outlet conduit 102A and the second outlet conduit 103A.

The refrigerant may then leave the first heat exchanger 105A through the second connecting port 1054A and may be guided to enter the third heat exchanger 114A through the first refrigerant port 1141A for releasing a predetermined amount of heat to ambient air. The refrigerant may then leave the third heat exchanger 114A through the second refrigerant port 1142A and may be arranged to flow through the flow regulator 109A and enter the second heat exchanger 106A through the second communication port 1062A. The refrigerant may then perform heat exchange with the air flowing in the first outlet conduit 102A and absorb heat from the air so as to lower the temperature of and decrease the humidity from the air coming from the air passage 15A but before passing through the first heat exchanger 105A. After that, the refrigerant may be arranged to leave the second heat exchanger 106A through the first communication port 1061A and flow back to the compressor 104A through the compressor inlet 1042A to compete a refrigeration cycle.

Figure 13:
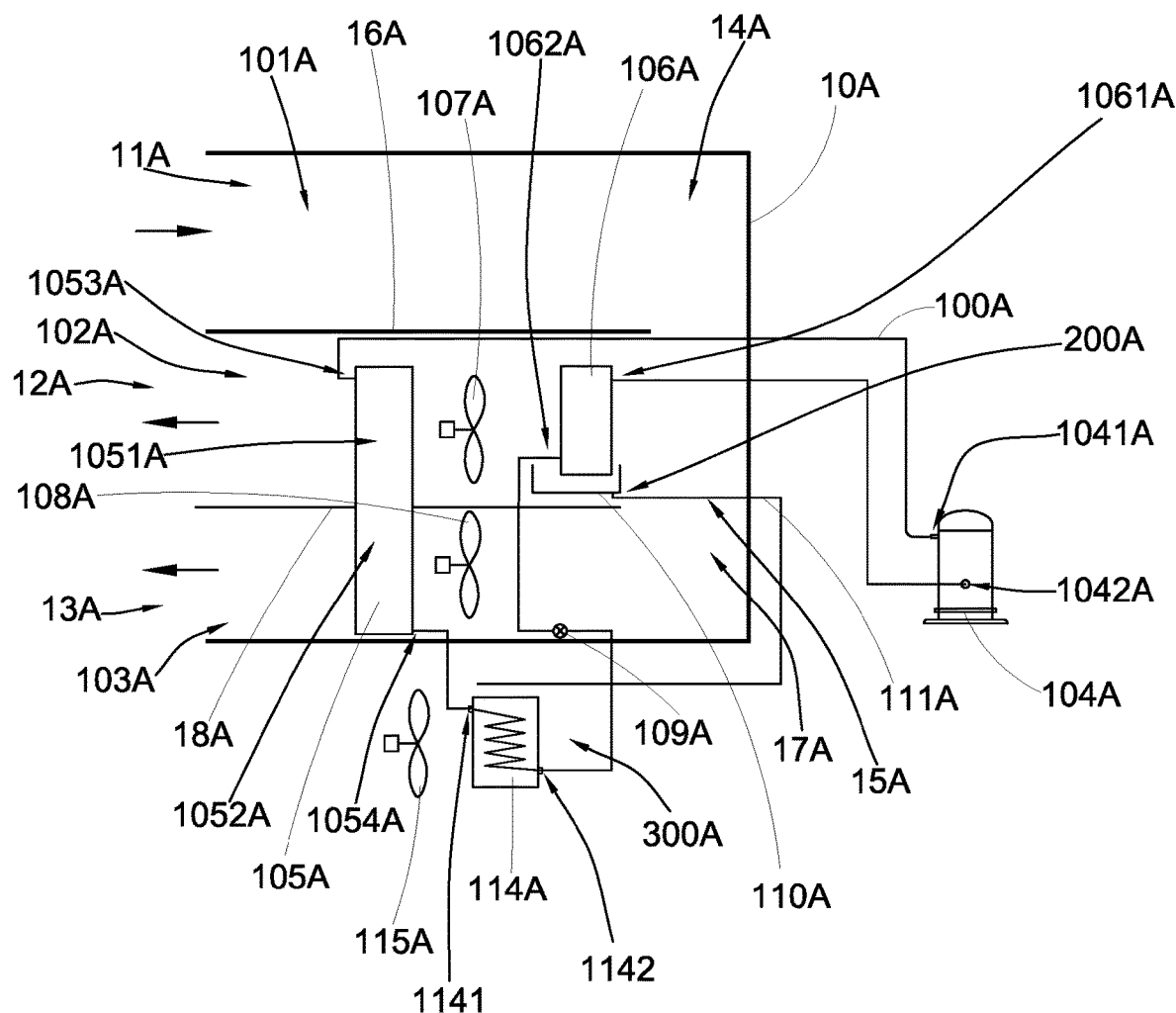
FIG. 13 is a schematic diagram of a first alternative mode of the heat pump dryer according to the second preferred embodiment of the present invention.

In the second preferred embodiment as shown in FIG. 12 of the drawings, the water discharge arrangement 200A is identical to what was described in the first preferred embodiment above. FIG. 13 illustrates a first alternative mode of the heat pump dryer according to the second preferred embodiment of the present invention. The first alternative mode of the second preferred embodiment is identical to the second preferred embodiment except the water discharge arrangement 200A. In the first alternative mode of the second preferred embodiment, the water collection tray 110A may be provided in the first outlet conduit 102A underneath the second heat exchanger 106A for collecting the residual or condensate water from the exterior surface of the second heat exchanger 106A. The water guiding tube 111A may extend from the water collection tray 110A to outside of the main casing 10A and reach the third heat exchanger 114A. Thus, the water collected in the water collection tray 110A may be guided to be sprayed on the third heat exchanger 114A so as to further cool down the temperature of the refrigerant passing through the third heat exchanger 114A.

When water is sprayed on the third heat exchanger 114A, the heat from the refrigerant flowing through the third heat exchanger 114A may be dissipated by ambient air and the water sprayed on the third heat exchanger 114A.

Figure 14:
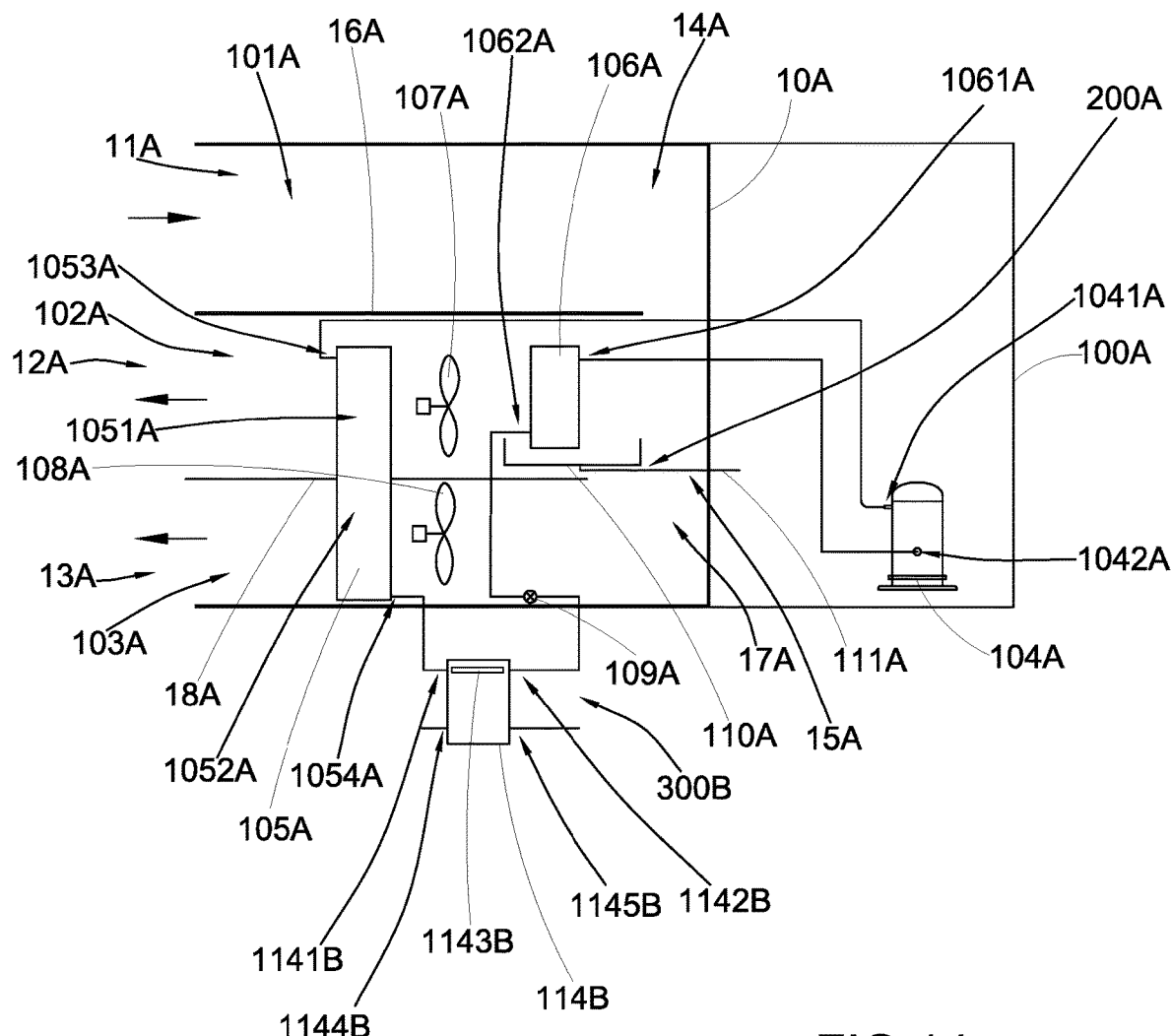
FIG. 14 is a schematic diagram of a second alternative mode of the heat pump dryer according to the second preferred embodiment of the present invention.

Referring to FIG. 14 of the drawings, a second alternative mode of the heat pump dryer according to the second preferred embodiment of the present invention is illustrated. The second alternative mode is identical to the second preferred embodiment as shown in FIG. 12 above, except the outdoor cooling unit 300B. According to the second alternative mode, the third heat exchanger 114B of the cooling unit 300B may be arranged to perform heat exchange between the refrigerant and another heat exchange medium. As shown in FIG. 14 of the drawings, the third heat exchanger 114B may have a first refrigerant port 1141B, a second refrigerant port 1142B, and at least one third heat exchanging pipe 1143B extended between the first refrigerant port 1141A and the second refrigerant port 1142A. Refrigerant may enter and exit the third heat exchanger 114B through the first refrigerant port 1141B and the second refrigerant port 1142B. Moreover, the third heat exchanger 114 may further have a third refrigerant port 1144B and a fourth refrigerant port 1145B in which another heat exchange medium, such as another stream of refrigerant or water, may be allowed to enter and leave the third heat exchanger 114B through the third refrigerant port 1144B and the fourth refrigerant port 1145B. This another heat exchange medium may be arranged to perform heat exchange with the refrigerant coming from the first heat exchanger 105A so as to absorb heat therefrom.

Figure 15:
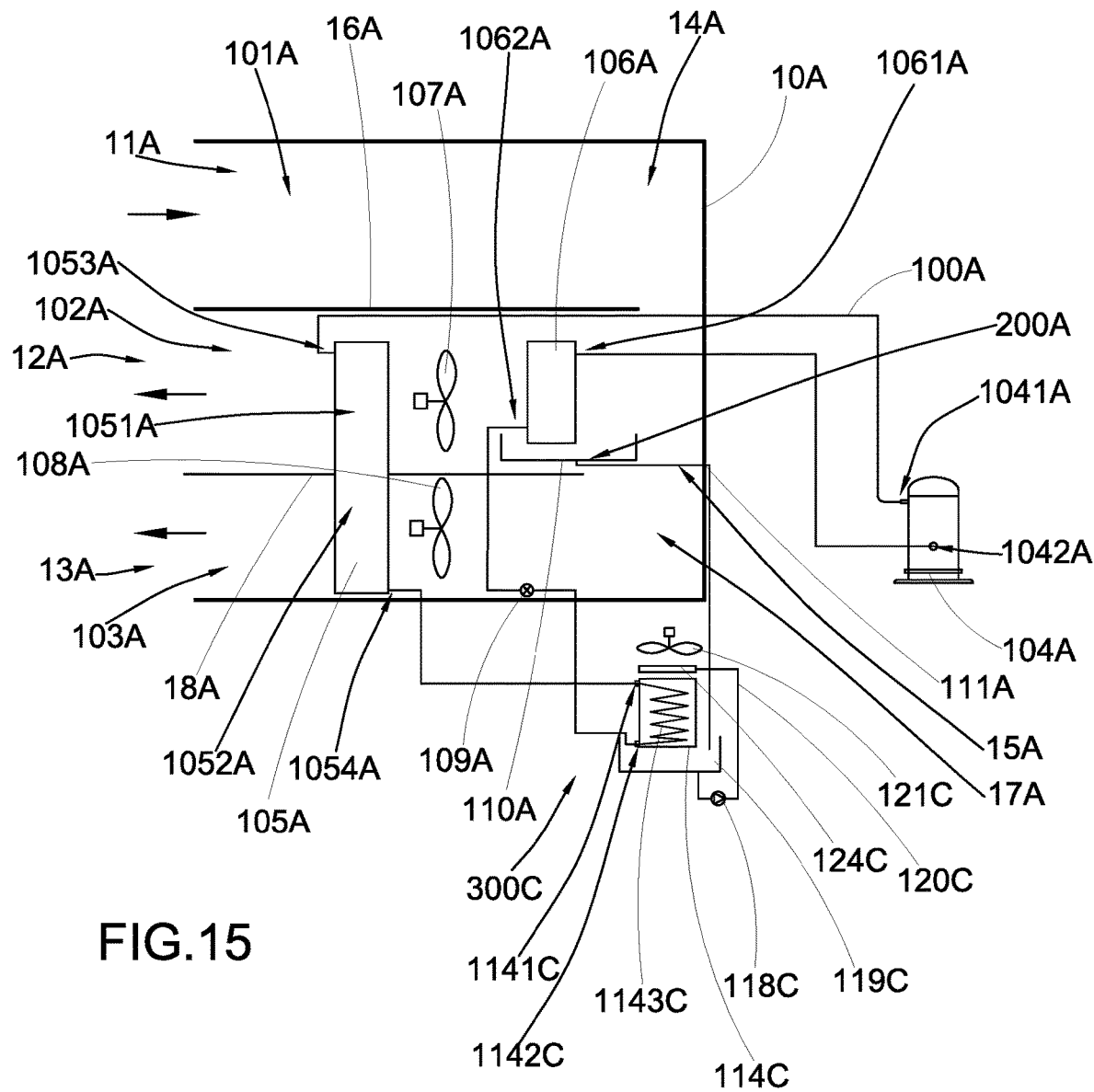
FIG. 15 is a schematic diagram of a third alternative mode of the heat pump dryer according to the second preferred embodiment of the present invention.

Referring to FIG. 15 of the drawings, the heat pump dryer according to a third alternative mode of the second preferred embodiment of the present invention is illustrated. The third alternative mode of the second preferred embodiment is similar to the second preferred embodiment as shown in FIG. 12 of the drawings, except the outdoor cooling unit 300C. According to the third alternative mode of the second preferred embodiment, the outdoor cooling unit 300C may comprise a third heat exchanger 114C, a third fan 121C supported in a vicinity of the third heat exchanger 114C, a water distributor 124C provided on top of the third heat exchanger 114C and arranged to spray a predetermined amount of water on an exterior surface of the third heat exchanger 114C, a water storage basin 119C provided underneath the third heat exchanger 114C for collecting residual water, and a water pump 118C connected between the water storage basin 119C and the water distributor 124C.

The third heat exchanger 114C may have a first refrigerant port 1141C and a second refrigerant port 1142C and a plurality of third heat exchanging pipes 1143C extended between the first refrigerant port 1141C and the second refrigerant port 1142C. Refrigerant may enter and exit the third heat exchanger 114C through the first refrigerant port 1141C and the second refrigerant port 1142C.

The first refrigerant port 1141C may be connected to the second connecting port 1054 of the first heat exchanger 105A, while the second refrigerant port 1142C may be connected to the second communication port 1062A of the second heat exchanger 106A and the flow regulator 109A. The third fan 121C may be positioned in a vicinity of the third heat exchanger 114C so as to supply air flow thereto. The third heat exchanger 114C may be arranged to perform heat exchange with the air flowing through the third heat exchanger 114C. The third heat exchanger 114C may be positioned in ambient environment out of the main casing 10.

The refrigerant leaving the first heat exchanger 105A through the second connecting port 1054A and may be guided to enter the third heat exchanger 114C through the first refrigerant port 1141C for releasing a predetermined amount of heat to ambient air. The refrigerant may then leave the third heat exchanger 114C through the second refrigerant port 1142C and may be arranged to flow through the flow regulator 109A and enter the second heat exchanger 106A through the second communication port 1062A. The refrigerant may then perform heat exchange with the air flowing in the first outlet conduit 102A and absorb heat from the air so as to lower the temperature of and decrease the humidity from the air coming from the air passage 15A but before passing through the first heat exchanger 105A. After that, the refrigerant may be arranged to leave the second heat exchanger 106A through the first communication port 1061A and flow back to the compressor through the compressor inlet 1042A to compete a refrigeration cycle.

For the outdoor cooling unit 300C, ambient air is drawn by the third fan 121C to flow through the external surface of the third heat exchanger 114C (i.e. external surfaces of the third heat exchanging pipes 1143C) so as to absorb heat from the refrigerant passing through the third heat exchanging pipes 1143C. Furthermore, a predetermined amount of water may circulate between the water storage basin 119C and the water distributor 124C. Water may be sprayed to the external surface of the third heat exchanger 114C. When air is drawn to pass through the external surface of the third heat exchanger 114C, heat from the refrigerant may be carried out effectively by evaporation of the water on the third heat exchanger 114C. This is in addition to the heat carried away by ambient air alone.

As shown in FIG. 15 of the drawings, the water circulating in the outdoor cooling unit 300C may be supplied by the water discharge arrangement 200A. Thus, the water guiding tube 111A may extend from the water collection tray 110A to the water storage basin 119C so that the water collected in the water collection tray 110A may be supplied to the water storage basin 119C. The water in the water storage basin 119C may be pumped by the water pump 118C to the water distributor 124C and may be sprayed to the third heat exchanger 114C.

It is worth mentioning that the present invention utilizes condensate or residual water extracted from the first outlet conduit 102A to be used to cool down the temperature of the refrigerant passing through the third heat exchanger 114C. The refrigerant having a lower temperature may then be arranged to lower the temperature of the air flowing from the air passage 15A so as to dehumidify the air before passing through the first heat exchanger 105A. In other words, the present invention utilizes residual or condensate water from the dehumidifying process itself to dehumidify the relevant air flow. The overall result is that the heat exchange efficiency of the entire heat pump dryer may be maximized.

Figure 16:
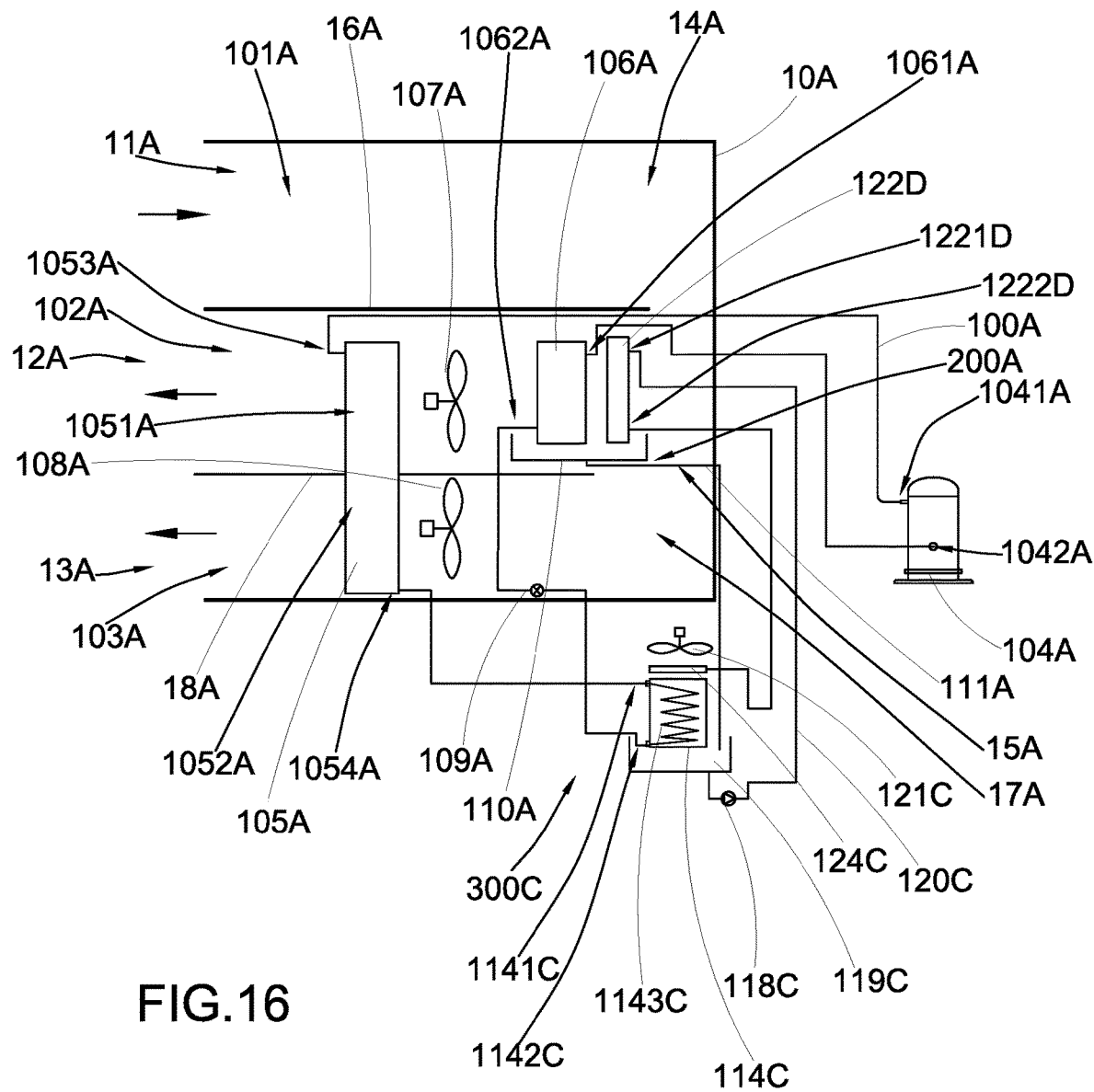
FIG. 16 is a schematic diagram of a fourth alternative mode of the heat pump dryer according to the second preferred embodiment of the present invention.

Referring to FIG. 16 of the drawings, a fourth alternative mode of the heat pump dryer according to the second preferred embodiment of the present invention is illustrated. The fourth alternative mode is similar to the third alternative mode shown in FIG. 15 of the drawings, except the heat pump dryer may further comprise an auxiliary heat exchanger 122D provided in the first outlet conduit 102A and positioned between the second heat exchanger 106A and the air passage 15A, so that air entering the first outlet conduit 102A from the air passage 15A may be arranged to flow through the auxiliary heat exchanger 122A first before flowing through the second heat exchanger 122A.

As mentioned in the first preferred embodiment, the purpose of the auxiliary heat exchanger 122D may be to pre-cool the air flowing in the first outlet conduit 102A before the air reaches the second heat exchanger 106A. Specifically, the auxiliary heat exchanger 122D may have a first passage port 1221D and a second passage port 1222D, wherein a predetermined heat exchange medium, such water, may enter or leave the auxiliary heat exchanger 122D through the first passage port 1221D and the second passage port 1222D. The heat exchange medium flowing through the auxiliary heat exchanger 122D may be arranged to perform heat exchange with the air flowing in the first outlet conduit 102A for absorbing heat therefrom. In the fourth alternative mode of the second preferred embodiment of the present invention, the first passage port 1221D may be connected to the water storage basin 119C and the water pump 118C through at least one of the connecting pipes 100A, while the second passage port 1222D may be connected to the water distributor 124C through at least one of the connecting pipes 100A.

Thus, when cooling the air in the first outlet conduit 102A, condensate or residual water may also be formed on the exterior surface of the auxiliary heat exchanger 122D. The water collection tray 110A of the water discharge arrangement 200A may be sized and positioned to be disposed underneath the second heat exchanger 106A and the auxiliary heat exchanger 122D. The water guiding tube 111A may extend from the water collection tray 110A to the water storage basin 119C so that the water collected in the water collection tray 110A may be supplied to the water storage basin 119C. The water in the water storage basin 119C may be pumped by the water pump 118C to the first passage port 1221D of the auxiliary heat exchanger 122D. The water in the auxiliary heat exchanger 122D may absorb heat from the air flowing in the first outlet conduit 102A and may exit the auxiliary heat exchanger 122D through the second passage port 1222D. The water leaving the auxiliary heat exchanger 122D may be arranged to flow to the water distributor 124C and sprayed on the third heat exchanger 114C. The water may then perform heat exchange with ambient air in a manner described in the third alternative above.

Figure 17:
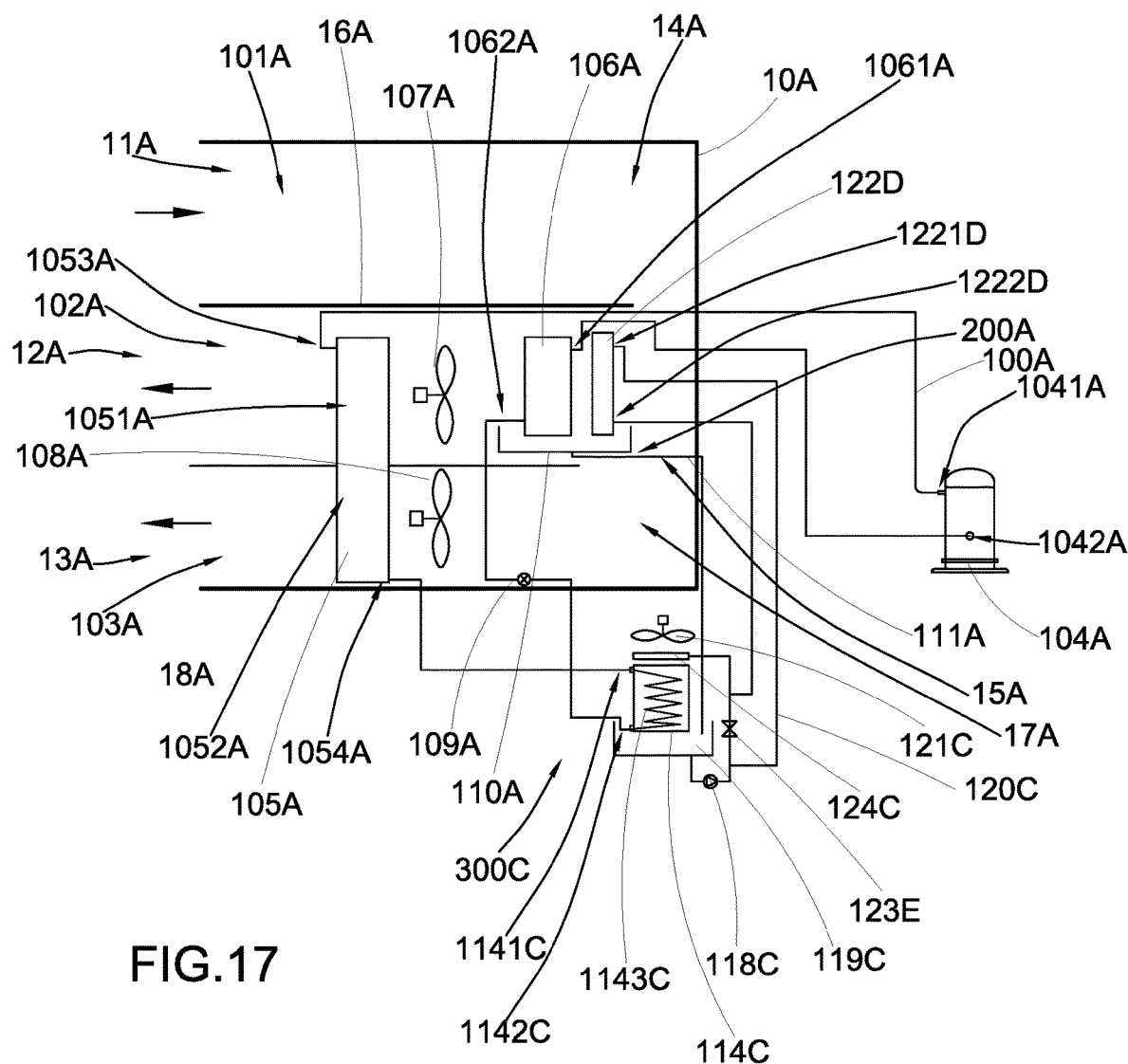
FIG. 17 is a schematic diagram of a fifth alternative mode of the heat pump dryer according to the second preferred embodiment of the present invention.

Referring to FIG. 17 of the drawings, a fifth alternative mode of the heat pump dryer according to the second preferred embodiment of the present invention is illustrated. The fifth alternative mode is essentially a combination of the third alternative mode and the fourth alternative mode of the second preferred embodiment. As shown in FIG. 17 of the drawings, the heat pump dryer may further comprise a control valve 123E connecting the water distributor 124C and the water storage basin 119C through connecting pipes 100A. Moreover, the first passage port 1221D of the auxiliary heat exchanger 122D may be connected to the water distributor 124C and the water storage basin 119C in parallel configuration. In other words, the water collected in the water storage basin 119C may be arranged to enter either the auxiliary heat exchanger 122D or the water distributor 124C through the control valve 123E.

From the forgoing descriptions, one skilled in the art may appreciate that the present invention effectively provides a heat pump dryer which is capable of providing two separate streams of drying air having different temperature and relative humidity so as to facilitate convenient drying of a wide variety of items which may have different drying requirements.

Embodiments of the present disclosure, while illustrated and described in terms of a preferred embodiment and several alternatives, is not limited to the particular description contained in this specification. Additional alternative or equivalent components could also be used to practice embodiments of the present disclosure.

What is claimed is:
1. A heat pump dryer, comprising:
a plurality of connecting pipes for allowing heat exchange medium to pass therethrough;
a main casing having an air inlet, a first air outlet, a second air outlet, a heat exchanging compartment, and an air passage, said main casing comprising a partitioning member provided in said heat exchanging compartment to divide said heat exchanging compartment into an air inlet channel and an air outlet channel, and an air outlet divider provided in said air outlet channel to divide said air outlet channel into a first outlet conduit and a second outlet conduit, wherein said air inlet channel communicates with said air inlet while said first outlet conduit and said second outlet conduit communicate with said first air outlet and said second air outlet respectively, said air inlet channel communicating with said air outlet channel through said air passage;
a compressor having a compressor inlet and a compressor outlet;
a first heat exchanger provided in said heat exchanging compartment of said main casing and connected to said compressor through at least one of said connecting pipes, said first heat exchanger having a first portion exposed to said first outlet conduit, and a second portion exposed to said second outlet conduit;

a second heat exchanger connected to said compressor and said first heat exchanger through at least one of said connecting pipes, said second heat exchanger being positioned in said first outlet conduit adjacent to said first portion of said first heat exchanger and between said first heat exchanger and said air passage; and a water discharge arrangement connected to said second heat exchanger;

wherein air is arranged to enter said air inlet channel through said air inlet, said air passing through said air inlet being bifurcated to pass through said first outlet conduit and said second outlet conduit through said air passage, said air in said first outlet conduit being arranged to sequentially flow through said second heat exchanger and said first portion of said first heat exchanger, said air in said second outlet conduit being arranged to flow through said second portion of said second heat exchanger, wherein a predetermined amount of refrigerant is arranged to leave said compressor and enter said first heat exchanger for releasing heat to said air passing therethrough, said refrigerant leaving said first heat exchanger being arranged to enter said second heat exchanger for absorbing a predetermined amount of heat from said air passing therethrough so as to remove a predetermined amount of water from said air passing through said second heat exchanger.

2. The heat pump dryer, as recited in claim 1, wherein said first heat exchanger has a first connecting port and a second connecting port provided on said first portion and said second portion respectively, wherein said refrigerant is arranged to enter and exit said first heat exchanger through at least one of said first connecting port and said second connecting port, said first connecting port being connected to said compressor outlet, said second connecting port being connected to said second heat exchanger, said heat pump dryer further comprising a flow regulator connected between said second connecting port and said second communication port for regulating a flow rate of said refrigerant passing between said first heat exchanger and said second heat exchanger.

3. The heat pump dryer, as recited in claim 2, wherein said second heat exchanger has a first communication port and a second communication port, wherein said refrigerant is arranged to enter and exit said second heat exchanger through at least one of said first communication port and said second communication port, said first communication port being connected to said compressor inlet, said second communication port being connected to said second connecting port of said first heat exchanger.

4. The heat pump dryer, as recited in claim 3, wherein said first heat exchanger comprises at least one first heat exchanging pipe connecting said first connecting port and said second connecting port, said first heat exchanging pipe extending from said first portion to said second portion in such a manner that said refrigerant flowing through said heat exchanging pipe is arranged to travel from said first outlet conduit to said second outlet conduit, at least two portions of said first heat exchanging pipes extending at an orientation which is substantially opposite to a direction of air flow in said first outlet conduit and said second outlet conduit respectively.

5. The heat pump dryer, as recited in claim 4, further comprising a first fan and a second fan provided in said first outlet conduit and said second outlet conduit respectively.

6. The heat pump dryer, as recited in claim 5, wherein said water discharge arrangement comprises a water collection tray provided in said first outlet conduit at a position underneath said second heat exchanger collecting condensate water therefrom, and a water guiding tube extended from said water collection tray to an exterior of said main casing so as to guide said water collected in said water collection tray to be discharged out of said main casing.

7. The heat pump dryer, as recited in claim 6, wherein said outlet divider is movably mounted in said air outlet channel so as to alter a relative size of said first outlet conduit and said second outlet conduit, in such a manner that said outlet divider is arranged to move along a longitudinal direction of said first heat exchanger so as to define said first outlet conduit and said second outlet conduit, and to define said first portion of said first heat exchanger as a portion of said first heat exchanger which is above said outlet divider, and said second portion of said first heat exchanger as a portion of said first heat exchanger which is below said outlet divider.

8. The heat pump dryer, as recited in claim 2, wherein said first heat exchanger comprises a first sub heat exchanger and a second sub heat exchanger, and a first joining pipe extending between said first sub heat exchanger and said second sub heat exchanger, wherein said first portion and said second portion are formed in said first sub heat exchanger and said second sub heat exchanger respectively, said first heat exchanging pipes in said first sub heat exchanger and said second sub heat exchanger being connected by said first joining pipe.

9. The heat pump dryer, as recited in claim 6, wherein said air outlet divider further has a ventilating window formed thereon for communicating said first outlet conduit with said second outlet conduit, said ventilating window being arranged to allow air from said first outlet conduit to flow to said second outlet conduit and vice versa, said ventilating window being positioned between said first heat exchanger and said second heat exchanger.

10. The heat pump dryer, as recited in claim 9, wherein said ventilating window is provided between said first fan and said first portion of said first heat exchanger while said second fan is positioned between said ventilating window and said second portion of said first heat exchanger.

11. The heat pump dryer, as recited in claim 9, wherein said ventilating window is positioned between said first fan and said second heat exchanger, and between said second fan and said second portion of said first heat exchanger, said first fan being positioned adjacent to said first portion of said first heat exchanger.

12. The heat pump dryer, as recited in claim 2, wherein said second heat exchanger has a third portion and a fourth portion exposed to said first outlet conduit and said second outlet conduit respectively, wherein said first communication port is provided on said third portion, while said second communication port is provided on said fourth portion.

13. The heat pump dryer, as recited in claim 12, wherein said water discharge arrangement comprises a water collection tray provided in said second outlet conduit at a position underneath said second heat exchanger for collecting condensate water therefrom, and a water guiding tube extended from said water collection tray to an exterior of said main casing so as to guide said water collected in said water collection tray to be discharged out of said main casing.

14. The heat pump dryer, as recited in claim 2, wherein said second heat exchanger comprises a third sub heat exchanger, a fourth sub heat exchanger, and a second joining pipe, wherein said third portion and said fourth portion are formed in said third sub heat exchanger and said fourth sub heat exchanger respectively, said second heat exchanging pipes extending in said third sub heat exchanger and said fourth sub heat exchanger and are connected by said second joining pipe.

15. The heat pump dryer, as recited in claim 14, wherein said water discharge arrangement comprises a water collection tray provided in said second outlet conduit at a position underneath said second heat exchanger for collecting condensate water therefrom, and a water guiding tube extended from said water collection tray to an exterior of said main casing so as to guide said water collected in said water collection tray to be discharged out of said main casing.

16. The heat pump dryer, as recited in claim 6, further comprising an auxiliary heat exchanger provided in said first outlet conduit and positioned between said second heat exchanger and said air passage, so that air entering said first outlet conduit from said air passage is arranged to flow through said auxiliary heat exchanger first before flowing through said second heat exchanger for pre-cooling said air flowing in said first outlet conduit before said air reaches said second heat exchanger.

17. The heat pump dryer, as recited in claim 16, wherein said water collection tray of said water discharge arrangement is sized and positioned to be disposed underneath said second heat exchanger and said auxiliary heat exchanger.

18. A heat pump dryer, comprising:
a plurality of connecting pipes for allowing heat exchange medium to pass therethrough;
a main casing having an air inlet, a first air outlet, a second air outlet, a heat exchanging compartment, and an air passage, said main casing comprising a partitioning member provided in said heat exchanging compartment to divide said heat exchanging compartment into an air inlet channel and an air outlet channel, and an air outlet divider provided in said air outlet channel to divide said air outlet channel into a first outlet conduit and a second outlet conduit, wherein said air inlet channel communicates with said air inlet while said first outlet conduit and said second outlet conduit communicate with said first air outlet and said second air outlet respectively, said air inlet channel communicating with said air outlet channel through said air passage;
a compressor;
a first heat exchanger provided in said heat exchanging compartment of said main casing and connected to said compressor through at least one of said connecting pipes, said first heat exchanger having a first portion exposed to said first outlet conduit, and a second portion exposed to said second outlet conduit;
a second heat exchanger connected to said compressor and said first heat exchanger through at least one of said connecting pipes, said second heat exchanger being positioned in said first outlet conduit adjacent to said first portion of said first heat exchanger and between said first heat exchanger and said air passage;
a water discharge arrangement connected to said second heat exchanger; and
an outdoor cooling unit, which comprises a third heat exchanger connected to said first heat exchanger and said second heat exchanger through at least one of said connecting pipes, said third heat exchanger being positioned out of said main casing and expose to ambient environment;
wherein air is arranged to enter said air inlet channel through said air inlet, said air passing through said air inlet being bifurcated to pass through said first outlet conduit and said second outlet conduit through said air passage, said air in said first outlet conduit being arranged to sequentially flow through said second heat exchanger and said first portion of said first heat exchanger, said air in said second outlet conduit being arranged to flow through said second portion of said first heat exchanger,
wherein a predetermined amount of refrigerant is arranged to leave said compressor and enter said first heat exchanger for releasing heat to said air passing therethrough, said refrigerant leaving said first heat exchanger being arranged to enter said third heat exchanger for further releasing heat to ambient environment, said refrigerant leaving said third heat exchanger being arranged to enter said second heat exchanger for absorbing a predetermined amount of heat from said air passing therethrough so as to remove a predetermined amount of water from said air passing through said second heat exchanger.

19. The heat pump dryer, as recited in claim 18, wherein said first heat exchanger has a first connecting port and a second connecting port provided on said first portion and said second portion respectively, wherein said refrigerant is arranged to enter and exit said first heat exchanger through at least one of said first connecting port and said second connecting port, said first connecting port being connected to said compressor outlet, said second connecting port being connected to said second heat exchanger, said second heat exchanger having a first communication port and a second communication port, wherein said refrigerant is arranged to enter and exit said second heat exchanger through at least one of said first communication port and said second communication port, said first communication port being connected to said compressor inlet, said second communication port being connected to said second connecting port of said first heat exchanger.

20. The heat pump dryer, as recited in claim 19, wherein said first heat exchanger comprises at least one first heat exchanging pipe connecting said first connecting port and said second connecting port, said first heat exchanging pipe extending from said first portion to said second portion in such a manner that said refrigerant flowing through said heat exchanging pipe is arranged to travel from said first outlet conduit to said second outlet conduit, at least two portions of said first heat exchanging pipes extending at an orientation which is substantially opposite to a direction of air flow in said first outlet conduit and said second outlet conduit respectively.

21. The heat pump dryer, as recited in claim 20, further comprising a first fan and a second fan provided in said first outlet conduit and said second outlet conduit respectively, said outdoor cooling unit further comprising a third fan supported in vicinity of said third heat exchanger for drawing ambient air to flow through said third heat exchanger.

22. The heat pump dryer, as recited in claim 21, wherein said third heat exchanger has a first refrigerant port, a second refrigerant port, and a plurality of third heat exchanging pipes extended between said first refrigerant port and said second refrigerant port, wherein said first refrigerant port is connected to said second connecting port of said first heat exchanger, while said second refrigerant port is connected to said second communication port of said second heat exchanger.

23. The heat pump dryer, as recited in claim 22, wherein said water discharge arrangement comprises a water collection tray provided in said first outlet conduit at a position underneath said second heat exchanger collecting condensate water therefrom, and a water guiding tube extended from said water collection tray to an exterior of said main casing to reach said third heat exchanger so that said water collected in said water collection tray is guided to be sprayed on said third heat exchanger so as to further cool down said temperature of said refrigerant passing through said third heat exchanger.

24. The heat pump dryer, as recited in claim 23, wherein said third heat exchanger is arranged to perform heat exchange between said refrigerant and another heat exchange medium, said third heat exchanger further having a third refrigerant port and a fourth refrigerant port, said another heat exchange medium being arranged to enter and leave said third heat exchanger through said third refrigerant port and said fourth refrigerant port.

25. The heat pump dryer, as recited in claim 22, wherein said outdoor cooling unit further comprises a water distributor provided on top of said third heat exchanger and arranged to spray a predetermined amount of water on an exterior surface of said third heat exchanger, a water storage basin provided underneath said third heat exchanger for collecting residual water, and a water pump connected between said water storage basin and said water distributor.

26. The heat pump dryer, as recited in claim 25, wherein said water discharge arrangement comprises a water collection tray provided in said first outlet conduit at a position underneath said second heat exchanger for collecting condensate water therefrom, and a water guiding tube extended from said water collection tray to said water storage basin so that said water collected in said water collection tray is to be supplied to said water storage basin, said water in said water storage basin being pumped by said water pump to said water distributor and may be sprayed to said third heat exchanger.

27. The heat pump dryer, as recited in claim 22, further comprising an auxiliary heat exchanger provided in said first outlet conduit and positioned between said second heat exchanger and said air passage, so that air entering said first outlet conduit from said air passage is arranged to flow through said auxiliary heat exchanger first before flowing through said second heat exchanger for pre-cooling said air flowing in said first outlet conduit before said air reaches said second heat exchanger.

28. The heat pump dryer, as recited in claim 25, further comprising an auxiliary heat exchanger provided in said first outlet conduit and positioned between said second heat exchanger and said air passage, said auxiliary heat exchanger having a first passage port and a second passage port, wherein a predetermined heat exchange medium is arranged to enter and leave said auxiliary heat exchanger through said first passage port and said second passage port, said first passage port connecting to said water storage basin and said water pump through at least one of said connecting pipes, while said second passage port connecting to said water distributor through at least one of said connecting pipes.

29. The heat pump dryer, as recited in claim 28, wherein said water discharge arrangement comprises a water collection tray provided in said first outlet conduit at a position underneath said second heat exchanger for collecting condensate water therefrom, and a water guiding tube extended from said water collection tray to said water storage basin so that said water collected in said water collection tray is supplied to said water storage basin, said water in said water storage basin being pumped by said water pump to said first passage port of said auxiliary heat exchanger, said water in said auxiliary heat exchanger being arranged to absorb heat from said air flowing in said first outlet conduit and exit said auxiliary heat exchanger through said second passage port, said water leaving said auxiliary heat exchanger being arranged to flow to said water distributor and sprayed on said third heat exchanger.

\* \* \* \* \*